(12) United States Patent
Guo et al.

(10) Patent No.: US 12,302,425 B2
(45) Date of Patent: May 13, 2025

(54) WIRELESS AUDIO SYSTEM, WIRELESS COMMUNICATION METHOD, AND DEVICE

(71) Applicant: Huawei Technologies Co., Ltd., Shenzhen (CN)

(72) Inventors: Yufeng Guo, Shenzhen (CN); Wei Qin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 207 days.

(21) Appl. No.: 17/926,799

(22) PCT Filed: May 20, 2021

(86) PCT No.: PCT/CN2021/094998
§ 371 (c)(1),
(2) Date: Nov. 21, 2022

(87) PCT Pub. No.: WO2021/233398
PCT Pub. Date: Nov. 25, 2021

(65) Prior Publication Data
US 2023/0209624 A1    Jun. 29, 2023

(30) Foreign Application Priority Data
May 22, 2020 (CN) .......................... 202010446694.7

(51) Int. Cl.
| | |
|---|---|
| *G06F 3/16* | (2006.01) |
| *H04R 1/10* | (2006.01) |
| *H04R 3/00* | (2006.01) |
| *H04R 29/00* | (2006.01) |
| *H04W 76/14* | (2018.01) |

(52) U.S. Cl.
CPC ............ *H04W 76/14* (2018.02); *G06F 3/162* (2013.01); *G06F 3/165* (2013.01); *H04R 1/1041* (2013.01); *H04R 3/00* (2013.01); *H04R 29/001* (2013.01); *H04R 2420/07* (2013.01)

(58) Field of Classification Search
CPC ....................................................... G06F 3/165
USPC ......................................................... 381/58
See application file for complete search history.

(56) References Cited

U.S. PATENT DOCUMENTS

| | | |
|---|---|---|
| 2005/0286713 A1 | 12/2005 | Gunn et al. |
| 2010/0034393 A1 | 2/2010 | Sorek et al. |
| 2016/0065159 A1* | 3/2016 | Yu .......................... H03G 5/025 381/61 |
| 2017/0048619 A1 | 2/2017 | Bang et al. |
| 2019/0026068 A1* | 1/2019 | Gan ........................ G06F 3/167 |
| 2020/0012475 A1 | 1/2020 | Tamaki et al. |

* cited by examiner

*Primary Examiner* — Katherine A Faley
(74) *Attorney, Agent, or Firm* — Conley Rose, P.C.

(57) ABSTRACT

A wireless communication method includes after a master device establishes a wireless connection to a slave device, performing negotiation on sound effect processing The master device determines, based on indication information fed back by the slave device, whether joint sound effect processing can be performed between the master device and the slave device. If joint sound effect processing can be performed, the method includes performing adaptive sound effect processing on both master device and slave device sides.

20 Claims, 17 Drawing Sheets

CONT. FROM FIG. 6A

CONT. FROM FIG. 6A

CONT. FROM FIG. 6A

S106: The master device determines to perform, on the master device side, sound effect processing on audio data A between the master device and the slave device by using a sound effect processing algorithm III S111: The master device determines to perform, on the slave device side, sound effect processing on audio data A between the master device and the slave device by using a sound effect processing algorithm IV S116: The master device selects, based on a sound effect processing algorithm I used by the slave device, a sound effect processing algorithm II that adapts to the sound effect processing algorithm I, and determines to perform, on the master device side, sound effect processing on audio data A between the master device and the slave device by using the sound effect processing algorithm II S107: The master device performs sound effect processing on the audio data A by using the sound effect processing algorithm III, to obtain audio data B S112: The master device directly sends the audio data A to the slave device through an audio connection between the master device and the slave device S117: The master device performs sound effect processing on the audio data A by using the sound effect processing algorithm II, to obtain audio data D S108: The master device sends the audio data B to the slave device through an audio connection between the master device and the slave device S113: The slave device performs sound effect processing on the audio data A by using the sound effect processing algorithm IV, to obtain audio data C S118: The master device sends the audio data D to the slave device through an audio connection between the master device and the slave device S109: The slave device plays the audio data B S114: The slave device plays the audio data C S119: The slave device performs sound effect processing on the audio data D by using the sound effect processing algorithm I, to obtain audio data E S120: The slave device plays the audio data E

FIG. 6B

WIRELESS AUDIO SYSTEM, WIRELESS COMMUNICATION METHOD, AND DEVICE

CROSS-REFERENCE TO RELATED APPLICATIONS

This is a U.S. National Stage of International Patent Application No. PCT/CN2021/094998 filed on May 20, 2021, which claims priority to Chinese Patent Application No. 202010446694.7 filed on May 22, 2020. Both of the aforementioned applications are hereby incorporated by reference in their entireties.

TECHNICAL FIELD

Embodiments of this application relate to the field of wireless technologies, and in particular, to a wireless audio system, a wireless communication method, and a device.

BACKGROUND

A Bluetooth (Bluetooth) wireless technology is a short-range communications system intended to replace a cable connection between portable and/or fixed electronic devices. A Bluetooth headset based on a Bluetooth communications technology is popular with consumers for a wireless connection mode and good sound quality of the Bluetooth headset. Scenarios in which a user uses Bluetooth to interconnect devices and play audio data are increasingly more, and are becoming increasingly common. For example, the user uses a mobile phone and a Bluetooth headset to listen to music or watch a video, the user uses a mobile phone and a vehicle-mounted device to listen to music or listen to navigation information, and the user uses a mobile phone and a Bluetooth speaker to listen to music or watch a video. In these scenarios in which the audio data is played by using the Bluetooth technology, an audio stream may pass through a master device (such as a mobile phone or a computer) and a slave device (such as a Bluetooth headset or a Bluetooth speaker). A sound effect algorithm of the master device and a sound effect algorithm of the slave device are usually two independent sound effect algorithms. When the audio stream passes through the master device and the slave device, the two independent sound effect algorithms may cause a sound effect conflict. For example, a gain of a sound effect of the master device at 1 kHz of an audio signal is increased by 2 dB, a gain of a sound effect of the slave device at 1 kHz of the audio signal is decreased by 2 dB. In this case, simple superimposition of sound effect algorithm effects may cause a final sound effect of the audio stream to be worse than a sound effect generated when the sound effect algorithm of the master device or the slave device is independently used.

Currently, there is no collaborative interaction solution for a sound effect algorithm of a Bluetooth interconnected device on a media stream in the industry. There is a similar collaborative interaction solution on a call stream. In this solution, in a call scenario, an interaction command is used to determine whether a sound effect algorithm of a master device or a sound effect algorithm of a slave device is used in the call stream. This solution can partially resolve a problem of cooperation between the sound effect algorithms of the master device and the slave device in the call stream

SUMMARY

Technical solutions of this application provide a wireless audio system, a wireless communication method, and a device, to implement sound effect processing negotiation between a master device and a slave device, fully use advantages of sound effect processing on both master device and slave device sides, further improve a sound effect, and meet a user's requirement on higher sound quality of audio.

According to a first aspect, an embodiment of this application provides a wireless communication method, applied to a wireless communications system. The wireless communications system includes a first device and a second device. The first device may be an electronic device such as a mobile phone or a tablet computer. The second device may be an audio output device such as a wireless headset or a speaker, for example, a TWS Bluetooth headset. The first device may be a master device in a wireless audio system, and the second device may be a slave device in the wireless audio system.

In the wireless communication method, the first device may establish a wireless communication connection to the second device. The first device may send a first request to the second device, to request to query a sound effect processing capability of the slave device. Correspondingly, the second device may send a first response to the first device, where the first response carries first indication information, and the first indication information may be used to indicate the sound effect processing capability of the second device. The first device may determine, based on the indication information fed back by the second device, whether the first device and the second device support joint sound effect processing. Specifically, the first device may determine whether the first device has a first sound effect processing algorithm, where the first sound effect processing algorithm is a sound effect processing algorithm that adapts to a second sound effect processing algorithm used by the second device, and the second sound effect processing algorithm is determined based on the first indication information. If the first device determines that the first sound effect processing algorithm exists, the following operations are performed: The first device may establish an audio connection to the second device. The first device processes first audio data by using the first sound effect processing algorithm, to obtain second audio data. Then, the first device may transmit the second audio data to the second device through the audio connection. The second device may process the second audio data by using the second sound effect processing algorithm, to obtain third audio data. The second device plays the third audio data.

The wireless communication connection may be a logical link control and adaptation protocol L2CAP connection, or may be a radio frequency communication RFCOMM connection. Based on the two different wireless communication connections, signaling implementations of the first request and the first response exchanged between the first device and the second device are correspondingly different, and implementations of the audio connection used to transmit the audio data between the first device and the second device are also correspondingly different. Details are described below.

The first indication information may include one or more of the following device parameters: a manufacturer and a product model of the second device.

The sound effect processing capability may include one or more of the following: a noise reduction capability and an echo cancellation capability. The second sound effect processing algorithm may include one or more of the following: a noise reduction algorithm and an echo cancellation algorithm.

According to the method provided in the first aspect, sound effect processing negotiation between the master device and the slave device can be implemented, advantages of sound effect processing on both master device and slave device sides are fully used, a sound effect is further improved, and a user's requirement on higher sound quality of audio is met.

With reference to the descriptions in the first aspect, whether the first device and the second device support joint sound effect processing may be summarized as the following three cases.

Case 1: The master device and the second device do not support joint sound effect processing, and the second device does not support sound effect processing.

Specifically, when the first device may determine, based on the device parameters such as the manufacturer and the product model that are fed back by the second device, that the second device does not have the sound effect processing capability, the first device may determine that a case of negotiating sound effect processing is Case 1. Whether the second device has the sound effect processing capability may be determined based on the device parameters such as the manufacturer and the product model that are fed back by the second device. The first device may find, locally or in the cloud based on device parameters such as a manufacturer and a product model of a second device such as a headset or a speaker, whether the second device has a sound effect processing capability such as noise reduction or echo cancellation, and a specific sound effect processing algorithm used by the second device when the second device has the sound effect processing capability.

Case 2: The master device and the second device do not support joint sound effect processing, and the second device supports sound effect processing.

Specifically, when the first device determines, based on the device parameters such as the manufacturer and the product model that are fed back by the second device, that the second device has the sound effect processing capability, if the first device cannot obtain, based on the sound effect processing algorithm used by the second device, a sound effect processing algorithm II that is of the first device and that adapts to a sound effect processing algorithm I on the second device side from a plurality of sets of sound effect processing algorithms of the first device, the first device may determine that a case of negotiating sound effect processing is Case 2.

Case 3: The master device and the second device support joint sound effect processing, and the second device supports sound effect processing.

Specifically, when the first device determines, based on the device parameters such as the manufacturer and the product model that are fed back by the second device, that the second device supports sound effect processing, if the first device can obtain, based on a sound effect processing algorithm I used by the second device, a sound effect processing algorithm II that adapts to the sound effect processing algorithm I from a plurality of sets of sound effect processing algorithms of the first device, the first device may determine that a case of negotiating sound effect processing is Case 3. The sound effect processing algorithm II may be used for sound effect processing of the first device in joint sound effect processing.

To determine the foregoing several cases, the first device may determine, in the following several manners, whether the first device has the sound effect processing algorithm II that is of the first device and that adapts to the sound effect processing algorithm I on the second device side.

Manner 1: The first device performs sound effect processing on a test signal and compares processing results, to select an adaptation algorithm.

Specifically, the first device may select one set of sound effect processing algorithms from the plurality of sets of sound effect processing algorithms of the first device, and sequentially process test audio data by using the one set of selected sound effect processing algorithms and the sound effect processing algorithm I on the second device side. If one or more of the following conditions are met: a signal-to-noise ratio measured based on the processed test audio data is better than a first signal-to-noise ratio and a second signal-to-noise ratio, and an echo component measured based on the processed test audio data is less than a first echo component and a second echo component, the first device determines that the first device has the sound effect processing algorithm II that adapts to the sound effect processing algorithm I. If the one or more conditions are not met, the first device continues to select a next set of sound effect processing algorithms from the plurality of sets of sound effect processing algorithms, and repeats the sound effect processing until a sound effect processing algorithm that meets the one or more conditions is selected. If none of the plurality of sets of algorithms can meet the one or more conditions, the first device may determine that the first device does not have the sound effect processing algorithm II that adapts to the sound effect processing algorithm I on the second device side.

The first device may further select, from the plurality of sets of sound effect processing algorithms, a sound effect processing algorithm that meets the one or more conditions and that has an optimal sound effect processing effect (for example, an optimal signal-to-noise ratio and a minimum echo component), to adapt to the sound effect processing algorithm I on the second device side.

The first signal-to-noise ratio and the first echo component may be respectively a signal-to-noise ratio and an echo component that are measured after the test audio data is processed by using the one set of selected sound effect processing algorithms, and the second signal-to-noise ratio and the second echo component may be respectively a signal-to-noise ratio and an echo component that are measured after the test audio data is processed by using the sound effect processing algorithm I on the second device side. The plurality of sets of sound effect processing algorithms of the first device may be locally stored in the first device, or may be stored on a cloud server and accessed by the first device.

Manner 2: The first device queries a table to obtain an adaptation algorithm.

Specifically, the first device may store or may access a mapping table. The mapping table may record correspondences between device parameters (device parameters such as a manufacturer and a product model) of a plurality of devices and a plurality of sets of sound effect processing algorithms. In the mapping table, a sound effect processing algorithm corresponding to a device parameter of a second device is a sound effect processing algorithm that is in the plurality of sets of sound effect processing algorithms of the first device and that adapts to a sound effect processing algorithm used by the second device. One set of sound effect processing algorithms may include a plurality of sound effect processing algorithms, for example, a noise reduction algorithm and an echo suppression algorithm. Certainly, one set of sound effect processing algorithms may alternatively include only one sound effect processing algorithm, for example, a noise reduction algorithm. This is not limited in this application. The mapping table may be written into a memory by the first device before delivery, may be downloaded by the first device from a server, or may be shared by another device. A source of the mapping table is not limited in this application.

Specifically, the first device may determine whether a sound effect processing algorithm corresponding to the device parameter of the second device exists in a first mapping table. If the sound effect processing algorithm corresponding to the device parameter of the second device exists in the first mapping table, the first device may determine that the first device has the sound effect processing algorithm II that adapts to the sound effect processing algorithm I on the second device side. The sound effect processing algorithm II is the sound effect processing algorithm corresponding to the device parameter of the second device in the mapping table.

In addition to the device parameters such as the manufacturer and the product model, the indication information that is of the sound effect processing capability and that is sent by the second device to the first device may further include a specific bit or a specific field. The specific bit or the specific field may be used to indicate whether the second device has the sound effect processing capability. For example, when the specific bit is 0, it indicates that the second device does not have the sound effect processing capability; or when the specific bit is 1, it indicates that the second device has the sound effect processing capability. In this way, the first device may directly determine, based on the specific bit or the specific field, whether the second device has the sound effect processing capability, and does not need to determine, based on the device parameters such as the manufacturer and the product model that are fed back by the second device, whether the second device has the sound effect processing capability. This brings higher efficiency. Further, if the first device determines, based on the specific bit or the specific field, that the second device does not have the sound effect processing capability, that is, Case 1, the first device may directly perform, on the first device, sound effect processing on the audio data between the master device and the second device by using a set of sound effect processing algorithms of the first device. If the first device determines that the second device has the sound effect processing capability, the first device further needs to determine, based on the device parameters such as the manufacturer and the product model, whether the master device and the second device support joint sound effect processing. For details, refer to Case 2 and Case 3.

With reference to the first aspect, in some embodiments, if the first device determines that the first device does not have the first sound effect processing algorithm, and the second device does not have the sound effect processing capability, that is, Case 1, the following operations are performed: The first device establishes the audio connection to the second device. The first device processes the first audio data by using a third audio processing algorithm, to obtain fourth audio data. The first device transmits the fourth audio data to the second device through the audio connection. The second device plays the fourth audio data.

With reference to the first aspect, in some embodiments, if the first device determines that the first device does not have the first sound effect processing algorithm, and the second device has the sound effect processing capability, that is, Case 2, the following operations are performed: The first device establishes the audio connection to the second device. The first device transmits the first audio data to the second device through the audio connection. The second device processes the first audio data by using the second sound effect processing algorithm, to obtain fifth audio data. The second device plays the fifth audio data.

With reference to the first aspect, in some embodiments, the wireless communication connection may be a logical link control and adaptation protocol L2CAP connection.

Based on the L2CAP connection, signaling implementations of the first request and the first response exchanged between the first device and the second device may be as follows:

The first request may include an L2CAP echo request (ECHO request), and the first response may include an L2CAP echo response (ECHO response).

Based on the L2CAP connection, the audio connection used to transmit the audio data between the first device and the second device may be implemented as follows: The audio connection may include a media audio connection established based on the L2CAP connection, for example, an advanced audio distribution profile A2DP connection. The audio data transmitted through the audio connection may include media audio data.

Specifically, the first device may establish the media audio connection to the second device when detecting a user operation of playing media audio.

With reference to the first aspect, in some embodiments, the wireless communication connection may be a radio frequency communication RFCOMM connection.

Based on the radio frequency communication RFCOMM connection, the audio connection used to transmit the audio data between the first device and the second device may be implemented as follows:

The first request may include a first AT command, and the first response may include a first AT response in response to the first AT command.

Based on the radio frequency communication RFCOMM connection, the audio connection used to transmit the audio data between the first device and the second device may be implemented as follows:

The audio connection may include a call audio connection established based on the RFCOMM connection, for example, a synchronous connection oriented link SCO connection. The audio data transmitted through the audio connection may include call audio data.

Specifically, the first device may establish the call audio connection to the second device when detecting a user operation of answering a call or making a call.

According to a second aspect, this application provides a wireless communication method, applied to the foregoing first device. In the method, the first device may establish a wireless communication connection to a second device. The first device may send a first request to the second device, to request to query a sound effect processing capability of the slave device. Correspondingly, the first device may receive a first response sent by the second device, where the first response carries first indication information, and the first indication information may be used to indicate that the sound effect processing capability of the second device. The first device may determine, based on the indication information fed back by the second device, whether the first device and the second device support joint sound effect processing. Specifically, the first device may determine whether the first device has a first sound effect processing algorithm, where the first sound effect processing algorithm is a sound effect processing algorithm that adapts to a second sound effect processing algorithm used by the second device, and the second sound effect processing algorithm is determined based on the first indication information. If the first device determines that the first sound effect processing algorithm exists, the following operations are performed: The first device may establish an audio connection to the second device. The first device processes first audio data by using the first sound effect processing algorithm, to obtain second audio data. Then, the first device may transmit the second audio data to the second device through the audio connection.

In this way, the second device processes the second audio data by using the second sound effect processing algorithm, to obtain third audio data. The second device plays the third audio data.

In the second aspect, for functions of the first device and other descriptions, refer to content in the first aspect. Details are not described herein again.

According to a third aspect, an embodiment of this application provides an electronic device. The electronic device may include a communications module, a memory, one or more processors, and one or more programs. The one or more processors are configured to execute one or more computer programs stored in the memory, so that the electronic device can implement any function of the first device in the first aspect or any function of the first device in the second aspect.

According to a fourth aspect, an embodiment of this application provides an audio output device. The audio output device may include a Bluetooth module, an audio module, a memory, and a processor. The memory stores one or more programs, and one or more processors are configured to execute the one or more programs stored in the memory, so that the audio output device can implement any function of the second device in the first aspect or any function of the second device in the second aspect.

According to a fifth aspect, an embodiment of this application provides a wireless communications system. The wireless communications system may include the first device and the second device described in the foregoing aspects.

According to a sixth aspect, an embodiment of this application provides a chip system. The chip system may be applied to an electronic device, the chip includes one or more processors, and the processor is configured to invoke computer instructions, so that the electronic device implements any possible implementation of the first aspect or any possible implementation of the second aspect.

According to a seventh aspect, a computer program product including instructions is provided. When the computer program product runs on an electronic device, the electronic device is enabled to perform any possible implementation of the first aspect or any possible implementation of the second aspect.

According to an eighth aspect, a computer-readable storage medium including instructions is provided. When the instructions are run on an electronic device, the electronic device is enabled to perform any possible implementation of the first aspect or any possible implementation of the second aspect.

BRIEF DESCRIPTION OF DRAWINGS

To describe technical solutions in embodiments of this application or in the background more clearly, the following briefly accompanying drawings for describing embodiments of this application or the background.

FIG. 6A and FIG. 6B show an overall procedure of a wireless communication method according to technical solutions of this application:

DESCRIPTION OF EMBODIMENTS

Terms used in implementations of this application are only used to explain specific embodiments of this application, but are not intended to limit this application.

Figure 1A:
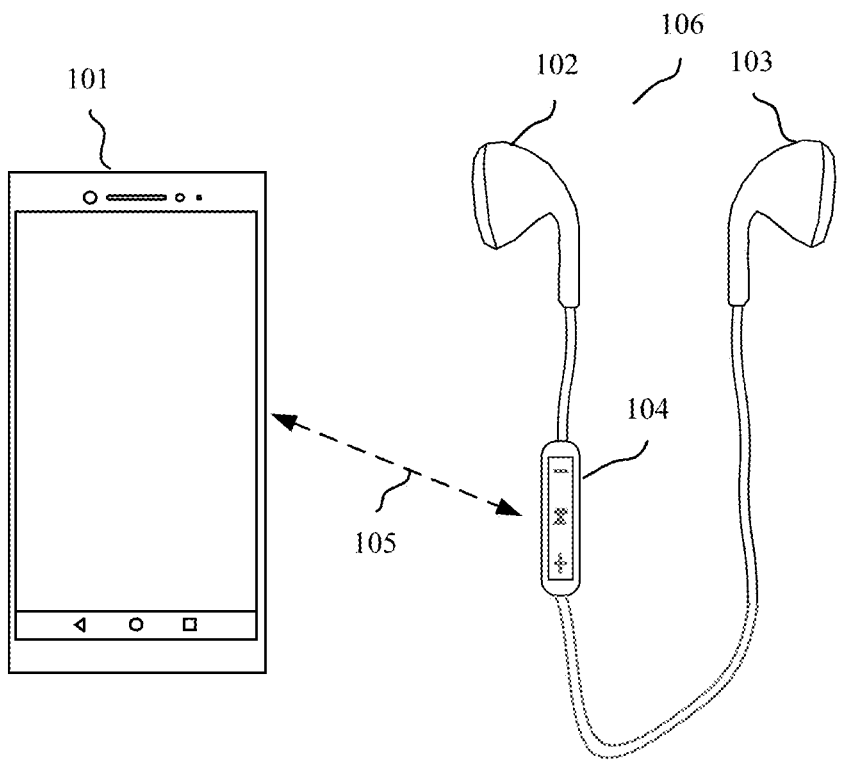
FIG. 1A shows a wireless audio system according to an embodiment of this application.

FIG. 1A shows a wireless audio system 100 according to an embodiment of this application. As shown in FIG. 1A, the wireless audio system 100 may include an electronic device 101 and an audio output device 106.

The electronic device 101 may be implemented as any one of the following electronic devices: a mobile phone, a portable game console, a portable media player, a personal computer, a vehicle-mounted media player, or the like.

The audio output device 106 may be responsible for converting audio data into sound. The audio output device 106 may be an audio output device such as a headphone, a neckband headset, or a speaker. A headset is used as an example. As shown in FIG. 1A, the audio output device 106 may include a left earbud 102, a right earbud 103, and a wire control 104. The left earbud 102 is connected to the wire control 104 by using a headset wire, and the right earbud 103 is also connected to the wire control 104 by using the headset wire. The wire control 104 may be configured with buttons such as a volume up button, a volume down button, and a play control button, and the wire control 104 may be further configured with a sound collection component such as a receiver/microphone.

A wireless communication connection 105 may be established between the electronic device 101 and the audio output device 106.

In a transmission direction from the electronic device 101 to the audio output device 106, the electronic device 101 may send audio data to the audio output device 106 through the wireless communication connection 105. In this case, a role of the electronic device 101 is an audio source (audio source), and a role of the audio output device 106 is an audio receiver (audio sink). In this way, the audio output device 106 may convert the received audio data into sound, so that a user wearing the audio output device 106 can hear the sound.

In addition to the audio data, the electronic device 101 and the audio output device 106 may further exchange, based on the wireless communication connection 105, a play control (for example, previous-song or next-song) message, a call control (for example, answering or declining) message, a volume control (for example, volume up or volume down) message, and the like. Specifically, the electronic device 101 may send the play control message and the call control message to the audio output device 106 through the wireless communication connection 105, so that play control and call control can be performed on the side of the electronic device 101. For example, when a user taps a music playing button on the electronic device 101, the electronic device may send an audio playing command to the audio output device 106 through the wireless communication connection 105, to trigger the audio output device 106 to play music. Specifically, the audio output device 106 may send the play control message and the call control message to the electronic device 101 through the wireless communication connection 105, so that play control and call control can be performed on the side of the audio output device 106. For example, when a user presses the volume up button on the wire control 104, the audio output device 106 may send a volume up command to the electronic device 101 through the wireless communication connection 105, to trigger the electronic device 101 to increase music playing volume.

Not limited to that shown in FIG. 1A, the electronic device 101 and the audio output device 106 may alternatively have different physical forms and sizes. This is not limited in this application.

The wireless audio system 100 shown in FIG. 1A may be a wireless audio system implemented based on a Bluetooth protocol. That is, the wireless communication connection 105 between the electronic device 101 and the audio output device 106 may be a Bluetooth communication connection.

Figure 1B:
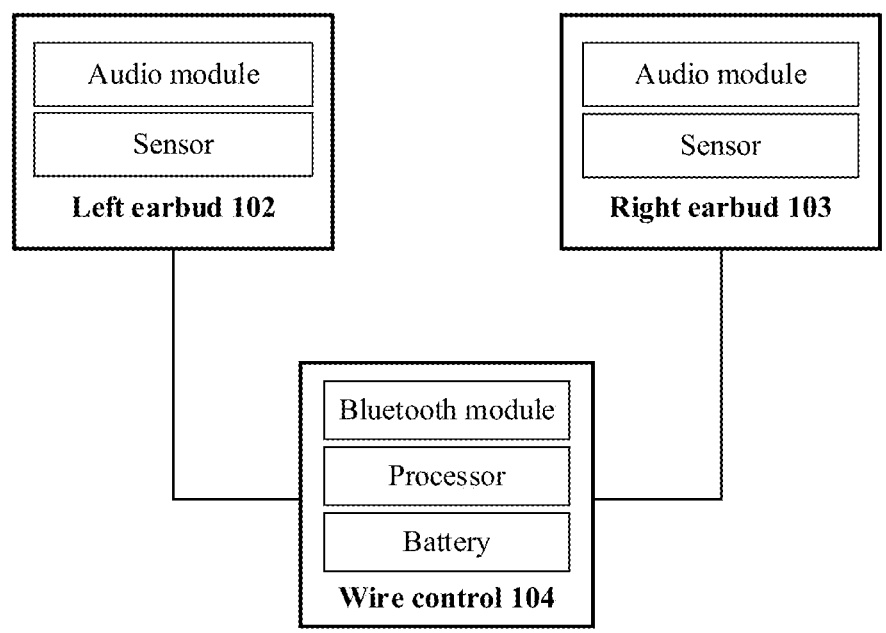
FIG. 1B shows a structure of an audio output device in the wireless audio system shown in FIG. 1A.

A structure of the audio output device 106 in FIG. 1A may be as shown in FIG. 1B.

The left earbud 102 and the right earbud 103 each may include an audio module, a sensor, and the like. The audio module may be configured to convert audio data into sound, and may be specifically an electro-acoustic transducer (electro-acoustic transducer). The sensor may be configured to detect a current application scenario of the left earbud 102 and the right earbud 103. The sensor may be an optical sensor, a capacitive sensor, an infrared sensor, or the like. The sensor may be referred to as a first sensor. For example, the left earbud 102 and the right earbud 103 may determine, in an optoelectronic detection manner, whether the headset is in an ear, and an optical sensor in the headset may sense a wearing state of a user by using an optical sensing principle. When detecting that an optical signal is blocked, the optical sensor feeds back, to a processor, that the headset is in the wearing state, then, the system automatically enters a play mode. On the contrary, when detecting an optical signal, the optical sensor feeds back, to the processor, that the headset is not in the wearing state, and then the system automatically pauses audio playing. In terms of user experience, the user may feel that when the headset is removed, audio playing automatically pauses, and when the headset is put on, the audio playing automatically resumes. Similarly, the headset may further perform in-ear detection based on a capacitance change fed back by the capacitive sensor, or may perform the in-ear detection based on a blocking state fed back by the infrared sensor.

The wire control 104 may include a Bluetooth module, a processor, and a battery. The Bluetooth module may be configured to receive or transmit a Bluetooth signal. The audio output device 106 may establish a Bluetooth communication connection to the electronic device 101 by using the Bluetooth module, and transmit a Bluetooth signal to the electronic device 101 or receive a Bluetooth signal transmitted by the electronic device 101 by using the Bluetooth communication connection. The processor may be coupled to the Bluetooth module, and the audio module and the sensor in the left earbud 102 and the audio module and the sensor in the right earbud 103. The processor may be responsible for reading instructions in a memory, decoding the instructions, and executing the instructions, to implement the wireless communication method provided in technical solutions of this application. The battery may be configured to supply power to components (such as the processor, the audio module, the sensor, and the Bluetooth module) in the audio output device 106.

In addition to the components shown in FIG. 1B, the audio output device 106 may further include another component. For example, a memory, a receiver, an indicator, and the like may be configured in the wire control 104.

In addition to the Bluetooth headset shown in FIG. 1A, the left earbud 102 and the right earbud 103 in the wireless audio system 100 may alternatively be audio output devices of other types. For example, in a home theater scenario, the left earbud 102 and the right earbud 103 in the wireless audio system 100 may alternatively be two speakers in the home theater scenario: a left audio channel speaker and a right audio channel speaker respectively. A control apparatus similar to the wire control 104 may also be connected between the two speakers.

Figure 2A:
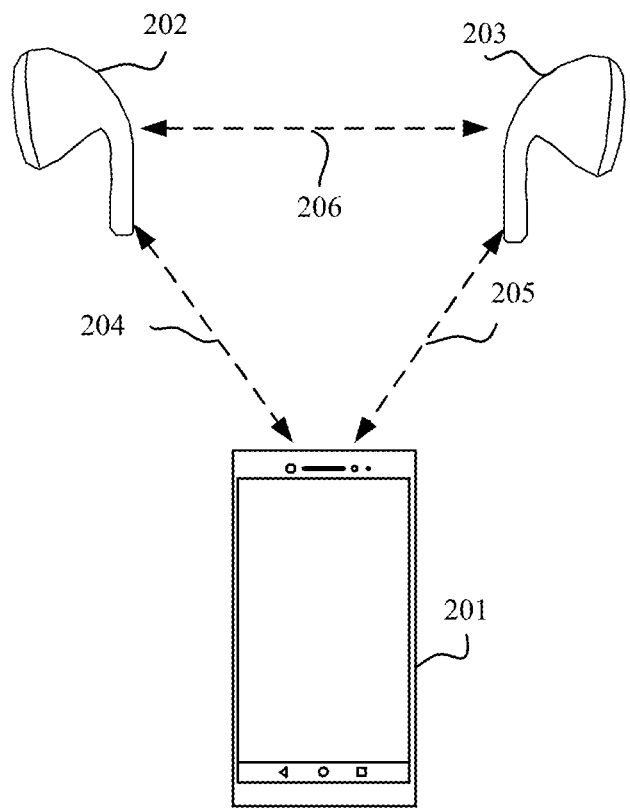
FIG. 2A shows another wireless audio system according to an embodiment of this application.

FIG. 2A shows another wireless audio system 200 according to an embodiment of this application. As shown in FIG. 2A, the wireless audio system 200 may include an electronic device 201, an audio output device 202, and an audio output device 203. The audio output device 202 and the audio output device 203 may be respectively a left earbud and a right earbud of a Bluetooth headset, and are configured to convert audio data into sound. Similarly, the electronic device 201 may be implemented as any one of the following electronic devices: a mobile phone, a portable game console, a portable media player, a personal computer, a vehicle-mounted media player, or the like.

Different from the wireless audio system 100 shown in FIG. 1A, there is no cable connection between the audio output device 202 and the audio output device 203. The two may communicate with each other by using a wireless communication connection 206 instead of a wired communication connection. The audio output device 202 and the audio output device 203 may be separated true wireless stereo (true wireless stereo, TWS) earbuds, and may be respectively a left earbud and a right earbud of a pair of TWS earbuds.

In the wireless audio system 200, the audio output device 202 and the audio output device 203 may respectively establish wireless communication connections to the electronic device 201. For example, the audio output device 202 may establish a wireless communication connection 204 to the electronic device 201, and may exchange audio data, a play control message, a call control message, and the like through the wireless communication connection 204. Similarly, a wireless communication connection 205 may be established between the electronic device 201 and the audio output device 203, and audio data, a play control message, a call control message, and the like may be exchanged through the wireless communication connection 205.

Not limited to that shown in FIG. 2A, the electronic device 201, the audio output device 202, and the audio output device 203 may alternatively have different physical forms and sizes. This is not limited in this application.

The wireless audio system 200 shown in FIG. 2A may be a wireless audio system implemented based on a Bluetooth protocol. That is, wireless communication connections (such as the wireless communication connection 204, the wireless communication connection 205, and the wireless communication connection 206) between the electronic device 201, the audio output device 202, and the audio output device 203 may be Bluetooth communication connections.

Figure 2B:
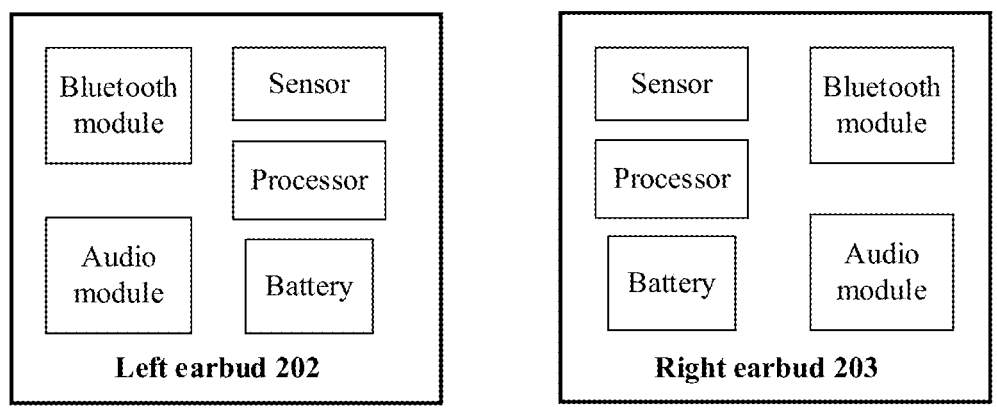
FIG. 2B shows a structure of an audio output device in the wireless audio system shown in FIG. 2A.

Structures of the audio output device 202 and the audio output device 203 in FIG. 2A may be as shown in FIG. 2B. Both the audio output device 202 and the audio output device 203 may include a Bluetooth module, an audio module, a sensor, a processor, and a battery. It can be learned that, different from the audio output device 106 in the wireless audio system 100 shown in FIG. 1A, the audio output device 202 and the audio output device 203 separately integrate functions of the wire control 104 of the audio output device 106.

The Bluetooth module may be configured to receive or transmit a Bluetooth signal. The audio output device 202 and the audio output device 203 may respectively establish Bluetooth communication connections to the electronic device 201 by using the Bluetooth module, and transmit a Bluetooth signal to the electronic device 201 or receive a Bluetooth signal transmitted by the electronic device 201 by using the Bluetooth communication connections. The audio output device 202 and the audio output device 203 may also communicate with each other by using the Bluetooth module. The processor may be coupled to the Bluetooth module, and the audio module and the sensor in the audio output device 202 and the audio module and the sensor in the audio output device 203. The processor may be responsible for reading instructions in a memory, decoding the instructions, and executing the instructions, to implement the wireless communication method provided in technical solutions of this application. The battery may be configured to supply power to components (such as the processor, the audio module, the sensor, and the Bluetooth module) in the audio output device 202 and the audio output device 203.

The audio module may be configured to convert audio data into sound, and may be specifically an electro-acoustic transducer (electro-acoustic transducer). The sensor may be configured to detect a current application scenario of the audio output device 202 and the audio output device 203. The sensor may be an optical sensor, a capacitive sensor, an infrared sensor, an acceleration sensor, a pressure sensor, a six-axis sensor, a bone voiceprint sensor, or the like. For example, the headset is used as an example. The left earbud 202 and the right earbud 203 may determine, in an optoelectronic detection manner, whether the headset is in an ear, and an optical sensor in the headset may sense a wearing state of a user by using an optical sensing principle. When detecting that an optical signal is blocked, the optical sensor feeds back, to the processor, that the headset is in the wearing state, then, the system automatically enters a play mode. On the contrary, when detecting an optical signal, the optical sensor feeds back, to the processor, that the headset is not in the wearing state, and then the system automatically pauses audio playing. In terms of user experience, the user may feel that when the headset is removed, audio playing automatically pauses, and when the headset is put on, the audio playing automatically resumes. Similarly, the headset may further perform in-ear detection based on a capacitance change fed back by the capacitive sensor, or may perform the in-ear detection based on a blocking state fed back by the infrared sensor. The headset may further detect a touch operation and a slide operation of the user by using the capacitive sensor, to complete operations such as music control and volume control. In addition, the left earbud 202 and the right earbud 203 may sense, by using the acceleration sensor, an action and a quantity of times that the user taps the headset, to implement operations such as waking up a voice assistant, switching music to a previous song/next song, and answering/declining a call. The left earbud 202 and the right earbud 203 may further sense, by using the pressure sensor, an action and a quantity of times that the user presses a headset leg, to switch a headset sound effect mode (for example, turn on/off a noise reduction mode/an ambient sound mode), wake up a voice assistant, switch music to a previous song/next song, answer or decline a call, and the like. The headset may further identify a head action of the user by using the six-axis sensor (a 3D accelerometer and a 3D gyroscope) inside the headset in cooperation with a head posture identification algorithm. For example, when a new incoming call is received, the user may answer or end the call by nodding or shaking a head. The bone voiceprint sensor in the headset may determine a feature of an owner based on bone voiceprint information, to ensure that the headset listens to only a command of the owner.

In addition to the components shown in FIG. 2B, the audio output device 202 and the audio output device 203 may further include another component. For example, a memory, a receiver, an indicator, and the like may be configured.

In addition to the Bluetooth headset shown in FIG. 2A, the audio output device 202 and the audio output device 203 in the wireless audio system 200 may alternatively be an audio output device of another type. For example, in a home theater scenario, the audio output device 202 and the audio output device 203 in the wireless audio system 200 may alternatively be two speakers in the home theater scenario: a left audio channel speaker and a right audio channel speaker respectively.

Based on the foregoing wireless audio systems, an embodiment of this application provides a wireless communication method.

In the wireless communication method provided in this embodiment of this application, after an electronic device (that is, a master device) successfully pairs with an audio output device (that is, a slave device) and establishes a wireless connection to the audio output device, the master device and the slave device may negotiate sound effect processing. Specifically, the master device may send a query request to the slave device, to obtain a sound effect processing capability of the slave device. Correspondingly, the slave device may send indication information of the sound effect processing capability of the slave device to the master device. For example, the indication information may include a plurality of fields, and the plurality of fields may include fields used to indicate device parameters such as a manufacturer and a product model. The master device determines, based on the indication information fed back by the slave device, whether joint sound effect processing can be performed between the master device and the slave device. If the master device determines that joint sound effect processing can be performed, adaptive sound effect processing is cooperatively performed on both master device and slave device sides.

In this application, joint sound effect processing means that the master device may determine, based on the device parameters such as the manufacturer and the product model that are fed back by the slave device, a sound effect processing algorithm I used by the slave device, and determine a sound effect processing algorithm II that is on the master device side and that adapts to the sound effect processing algorithm I. The master device performs sound effect processing on audio data between the master device and the slave device by using the sound effect processing algorithm II on the master device side, and then the slave device continues to perform sound effect processing on the audio data by using the sound effect processing algorithm I on the slave device side. The sound effect processing algorithm II on the master device side adapts to the sound effect processing algorithm I on the slave device side.

Herein, adaptation may be specifically represented as follows: sequentially processing audio data (for example, test audio data) by using the sound effect processing algorithm I and the sound effect processing algorithm II, where a signal-to-noise ratio measured based on the processed audio data is better than a first signal-to-noise ratio and a second signal-to-noise ratio, or an echo component measured based on the processed audio data is less than a first echo component and a second echo component, or the signal-to-noise ratio measured based on the processed audio data is better than the first signal-to-noise ratio and the second signal-to-noise ratio, and the echo component is less than the first echo component and the second echo component. The first signal-to-noise ratio and the first echo component are respectively a signal-to-noise ratio and an echo component that are measured after the audio data is processed by using the sound effect processing algorithm I, and the second signal-to-noise ratio and the second echo component are respectively a signal-to-noise ratio and an echo component that are measured after the audio data is processed by using the sound effect processing algorithm II.

In other words, adaptation means that the sound effect processing algorithm I on the slave device side and the sound effect processing algorithm II on the master device side can cooperate with each other and complement each other, and sound effect processing advantages of the sound effect processing algorithms can be fully used. In this way, a sound effect processing effect of the sound effect processing algorithm I and a sound effect processing effect of the sound effect processing algorithm II generally do not cancel each other out, but enhance each other, to present a better sound effect.

The following first describes a Bluetooth connection and an audio connection in embodiments of this application.

(1) Bluetooth Connection

The Bluetooth connection refers to a Bluetooth physical connection, for example, a connectionless asynchronous connection (asynchronous connectionless link, ACL). The Bluetooth connection may be established by a master device (master, that is, a device that initiates a connection request) and a slave device (slave, that is, a device that receives the connection request) through inquiry (inquiry) and paging (paging) processes. In one case, the master device is an electronic device (such as a mobile phone), and the slave device is a Bluetooth headset. In another case, the master device is a Bluetooth headset, and the slave device is an electronic device (such as a mobile phone).

(2) Audio Connection

The audio connection (audio connection) may include a call audio connection (call audio connection) and a media audio connection (media audio connection). The call audio connection may be used to transmit voice data, and the media audio connection may be used to transmit media audio data. The call audio connection may be a synchronous connection oriented link (synchronous connection oriented link, SCO) used in a calling scenario. The media audio connection may be an advanced audio distribution profile (advanced audio distribution profile, A2DP) connection.

Different audio connections are further correspondingly configured with different profile (profile) connections for audio control. Specifically, a call audio control connection may be configured for the call audio connection, and may be used to transmit call control signaling (such as answering or declining). The call audio control connection may be a hands-free profile (hands-free profile, HFP) connection. The media audio connection may be configured with a media audio control connection, and may be used to transmit media audio play control signaling (such as previous-song, next-song, pause, play, and volume-control). The media audio control connection may be an audio and video remote control profile (audio/video remote control profile, AVRCP) connection.

A profile (profile) connection is established based on a logical link control and adaptation protocol (logical link control and adaptation protocol, L2CAP) channel. L2CAP is located on a baseband (baseband), is responsible for converting baseband data into a data packet format that facilitates application decoding, and provides functions such as protocol multiplexing and service quality exchange. Establishment of the Bluetooth physical connection is described in the foregoing (1). However, if an upper-layer application (such as the A2DP) needs to communicate between the master device and the slave device, a corresponding L2CAP channel further needs to be established at an L2CAP layer. These channels are used for communication in various different profiles. At the L2CAP layer, an L2CAP channel corresponding to a profile may be represented by using a channel identity (channel identity, CID). When a specific profile is no longer used, an L2CAP channel corresponding to the profile needs to be cleared.

L2CAP supports only ACL data transmission and does not support SCO data transmission.

(3) Process of Establishing a Media Audio Connection (Media Audio Connection)

Figure 3:
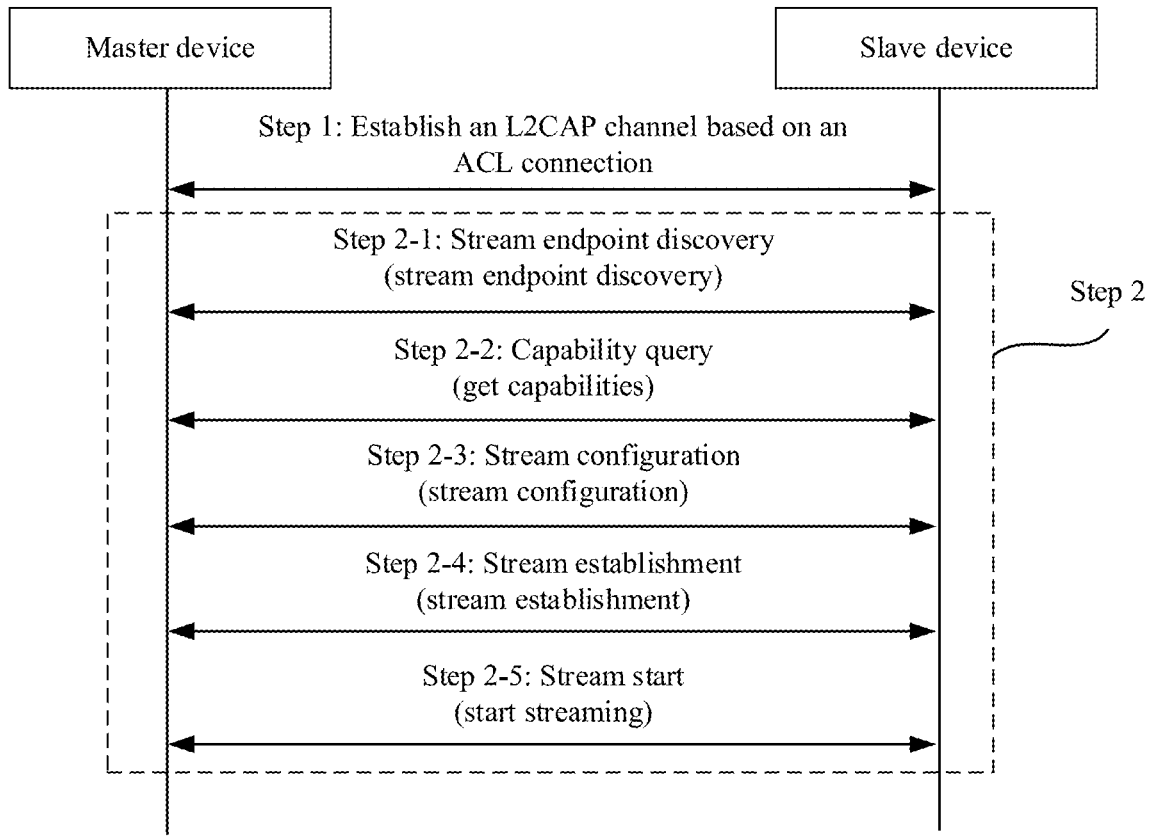
FIG. 3 shows a process of establishing a media audio connection according to an embodiment of this application.

The A2DP connection is used as an example. As shown in FIG. 3, the process of establishing the media audio connection may include the following steps.

Step 1: The master device and the slave device establish the L2CAP channel based on the ACL connection. The L2CAP channel used for the A2DP may include an L2CAP channel used to transmit signaling (signaling) and an L2CAP channel used to transmit a stream (stream). The L2CAP channel used for the signaling may be referred to as an AVDTP signaling L2CAP channel, and the L2CAP channel used for the stream may be referred to as an AVDTP stream L2CAP channel.

Step 2: The master device and the slave device establish the A2DP connection based on the L2CAP channel used for the A2DP, which may specifically include step 2-1 to step 2-5.

Step 2-1: Perform a stream endpoint (stream endpoints) discovery process.

For example, the master device may send, through the AVDTP signaling L2CAP channel, an AVDPT_DISCOVER command to the slave device for discovering the stream endpoint (stream endpoints, SEP) in the device. Correspondingly, the slave device returns a response, where the response may carry an identifier of the SEP (SEID) that can be provided by the slave device.

Step 2-2: Perform a capability (capabilities) query process.

For example, after the SEP is discovered, the master device may send, through the AVDTP signaling L2CAP channel, an AVDPT_GET_CAPABILITIES command to the slave device for obtaining a service that can be provided by the SEP of the slave device. Correspondingly, the slave device feeds back, to the master device, the service that can be provided by the SEP of the slave device.

Step 2-3: Perform a stream configuration (stream configuration) process.

For example, after finding the service that can be provided by the SEP of the slave device, the master device may send, through the AVDTP signaling L2CAP channel, an AVDPT_SET_CONFIGURATION command to the slave device for configuring the service provided by the SEP of the slave device, for example, configuring an audio channel and a sampling rate of audio.

Step 2-4: Perform a stream establishment (stream establishment) process.

For example, after the stream configuration is completed, the master device may send, through the AVDTP signaling L2CAP channel, an AVDPT_OPEN command to the slave device for establishing the stream. The established stream may also be referred to as a streaming connection (streaming connection), that is, the A2DP connection. Therefore, the A2DP connection is established.

Step 2-5: Perform a stream start (stream start) process.

For example, the master device may send, through the AVDTP signaling L2CAP channel, an AVDPT_START command to the slave device for starting the stream. After the stream is started, the stream can be used to transmit media audio data. Herein, the media audio refers to mono (mono) and stereo (stereo) audio, which is different from voice audio transmitted through the SCO connection. Subsequently, the master device and the slave device may close the stream by using an AVDPT_CLOSE command, that is, disconnect the A2DP connection.

Similar to the establishment of the A2DP connection, the AVRCP connection is also established based on the Bluetooth connection (ACL) and the L2CAP channel. Details are not described herein. For a process of establishing the AVRCP connection, refer to the AVRCP.

(4) Process of Establishing a Call Audio Connection (Call Audio Connection)

Figure 4:
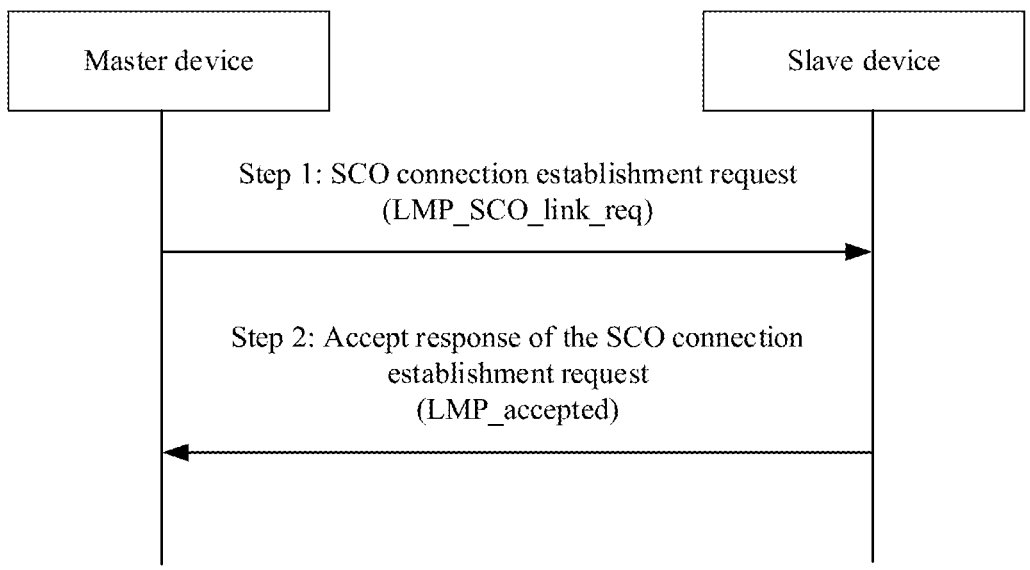
FIG. 4 shows a process of establishing a call audio connection according to an embodiment of this application.

An SCO connection is used as an example. As shown in FIG. 4, a process of establishing a call audio connection may include the following steps.

Step 1: The master device sends an SCO connection establishment request to the slave device, to initiate establishment of an SCO connection.

Step 2: The slave device returns an accept response of the SCO connection establishment request to the master device.

The SCO connection establishment request may be LMP_SCO_link_req signaling, and the SCO connection establishment request accept response may be LMP_accepted signaling. If the slave device cannot establish the SCO connection, the slave device may return LMP_not_accepted (a rejection response to the SCO connection establishment request), indicating that the SCO connection cannot be established.

In addition to that shown in FIG. 4, the establishment of the SCO connection may also be initiated by the slave device. Subsequently, the master device and the slave device may disconnect (or remove) the SCO connection by removing the SCO connection establishment request (for example, LMP_remove_SCO_link_req signaling).

Specifically, the SCO connection may be established by the master device and the slave device in response to an internal event or a user operation (making a call or answering a call). When an answering state of a call is switched from a Bluetooth headset to an earpiece or a speaker of an electronic device, the SCO connection is broken. The SCO connection may be used as an auxiliary connection of the HFP connection, and may be used to transmit voice data. How to establish the HFP connection is mentioned below Details are not described herein. The SCO connection can be established only after the ACL connection is established. This is because the HFP connection needs to be established based on the ACL connection.

(5) Process of Establishing a Call Audio Control Connection

Figure 5:
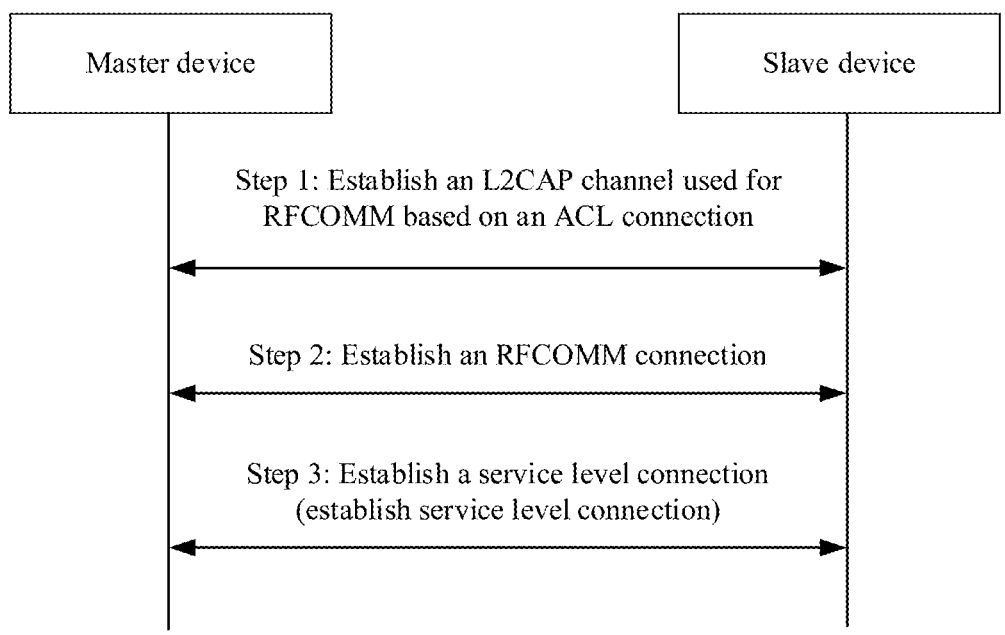
FIG. 5 shows a process of establishing a call audio control connection according to an embodiment of this application.

The HFP connection is used as an example. As shown in FIG. 5, the process of establishing the call audio control connection may include the following steps:

Step 1: The master device and the slave device establish, based on the ACL connection, an L2CAP channel used for radio frequency (radio frequency communication, RFCOMM).

Step 2: The master device and the slave device establish an RFCOMM connection based on the L2CAP channel. For a process of establishing the RFCOMM connection, refer to a generic access profile (generic access profile, GAP) and a serial port profile (serial port profile, SPP).

Step 3: In response to a user operation (dialing a call or answering a call) or an internal event and based on the existing RFCOMM connection, the master device and the slave device may establish a service level connection (establish service level connection), where therefore, the HFP connection is established.

Subsequently, the master device and the slave device may release the service level connection (release service level connection) by using a service level connection removal procedure (service level connection removal procedure), that is, disconnect the HFP connection. Once an established service level connection is released, the RFCOMM connection corresponding to the service level connection is also removed. Similarly, the audio connection (the SCO connection) corresponding to the service level connection is removed.

For a process of establishing the service level connection and the service level connection removal procedure, refer to the HFP.

Figure 6A:
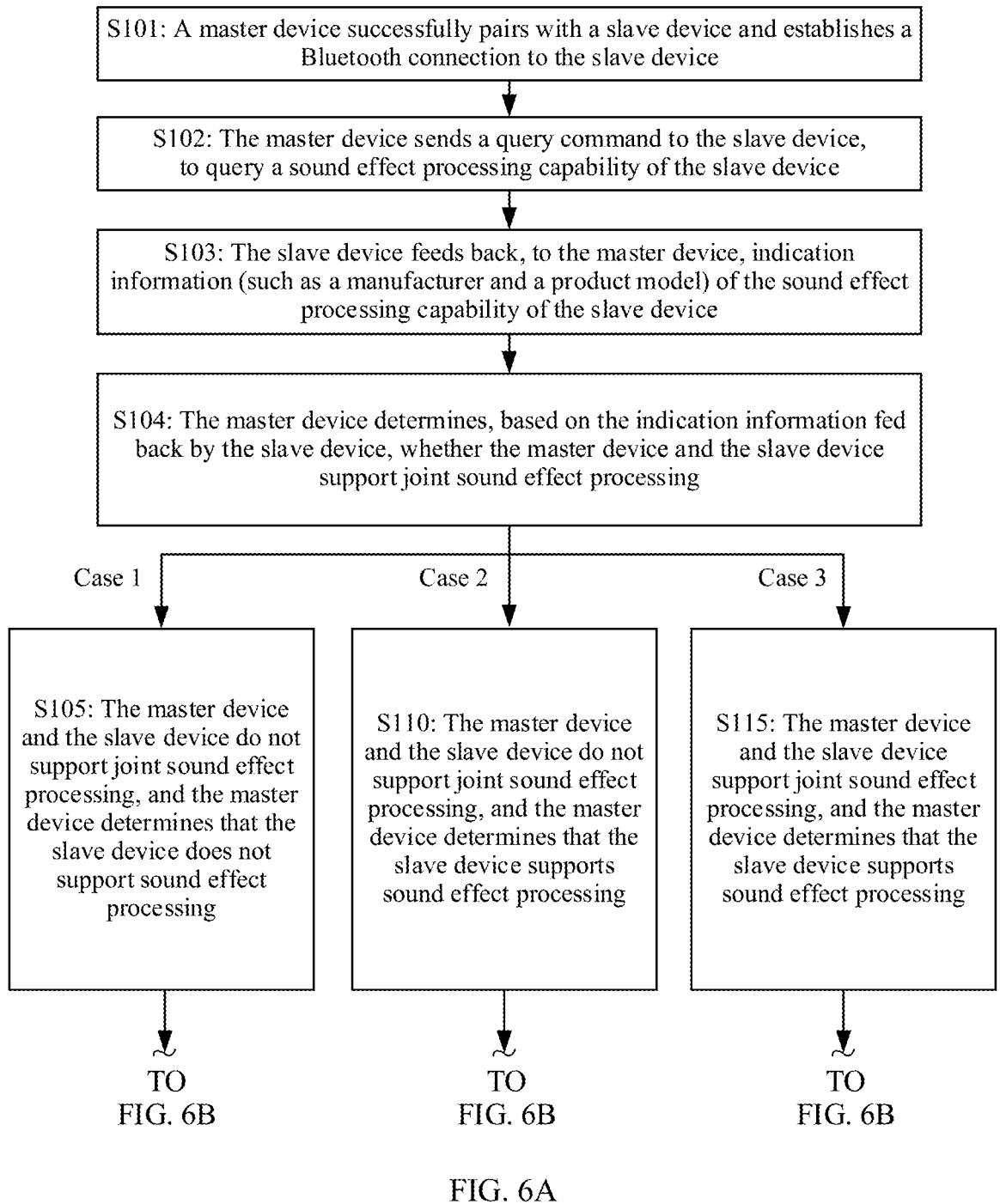

FIG. 6A and FIG. 6B show an overall procedure of a wireless communication method according to an embodiment of this application. The master device is the foregoing electronic device, and the slave device is an audio output device. Details are described below.

S101: The master device successfully pairs with the slave device and establishes a Bluetooth connection to the slave device.

The pairing may create a shared key: a link key (Link Key) between the master device and the slave device. The link key (Link Key) is used by the master device and the slave device to authenticate each other and encrypt exchanged data.

The Bluetooth connection may be a Bluetooth physical connection used for audio transmission, for example, an ACL connection. The master device and the slave device may establish the ACL connection through inquiry (inquiry) and paging (paging) processes.

When Bluetooth of the master device and the slave device is enabled, the master device and the slave device start to perform S101.

Figure 7A:
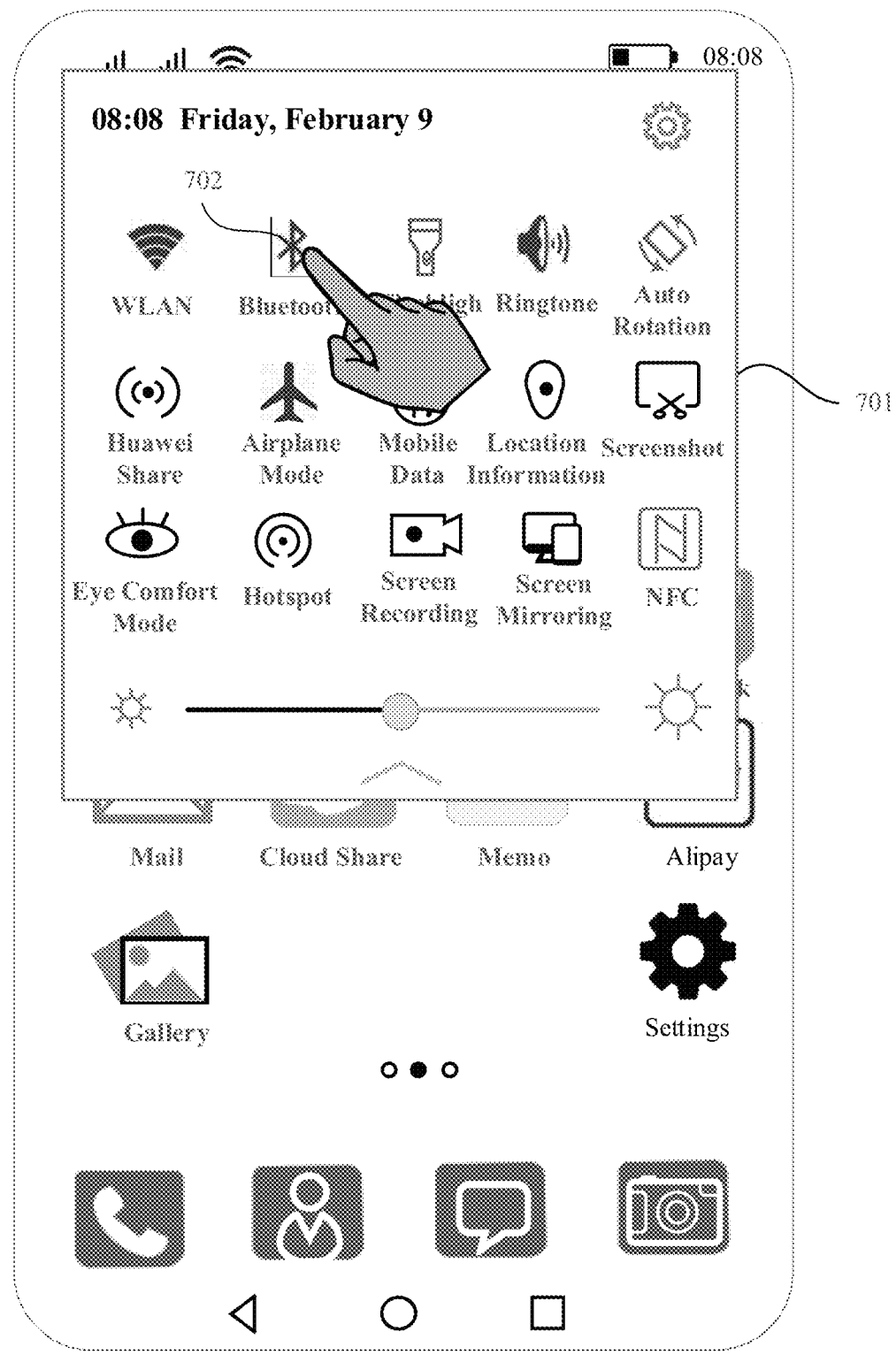
FIG. 7A shows a user operation of enabling a Bluetooth function of an electronic device.
Figure 7B:
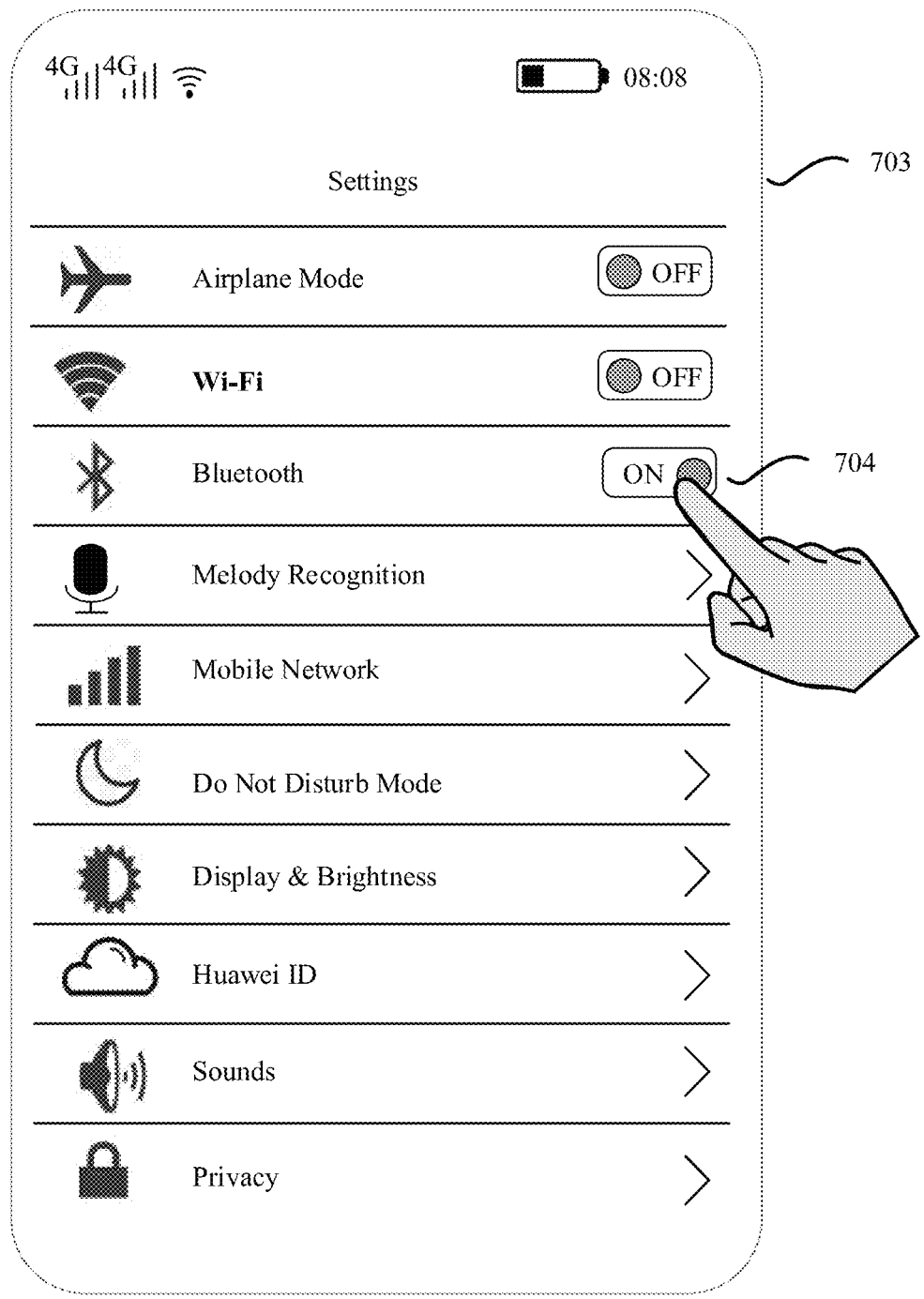
FIG. 7B shows another user operation of enabling a Bluetooth function of an electronic device.

In one manner, as shown in FIG. 7A, a user may tap a Bluetooth option 702 in a drop-down status bar 701 displayed on the electronic device to enable the Bluetooth of the electronic device. In another manner, as shown in FIG. 7B, the user may further enable the Bluetooth of the electronic device through a Bluetooth switch 704 in a "Settings" interface 703 of the electronic device. "Settings" is an application or a service on the electronic device, and may be responsible for configuring various functions of the electronic device, such as an airplane mode, wireless fidelity (wireless fidelity, Wi-Fi), Bluetooth, and a mobile network. Without being limited to the two manners shown in FIG. 7A and FIG. 7B, the Bluetooth of the electronic device may be further enabled by triggering of an internal event. The internal event may be, for example, an event of enabling a sharing service such as "Huawei Share". Enabling the sharing service "Huawei Share" will trigger enabling of the Bluetooth and Wi-Fi.

The slave device, such as a Bluetooth headset or a Bluetooth speaker, may generally enable the Bluetooth after being powered on, and the user does not need to manually enable the Bluetooth additionally.

Figure 7C:
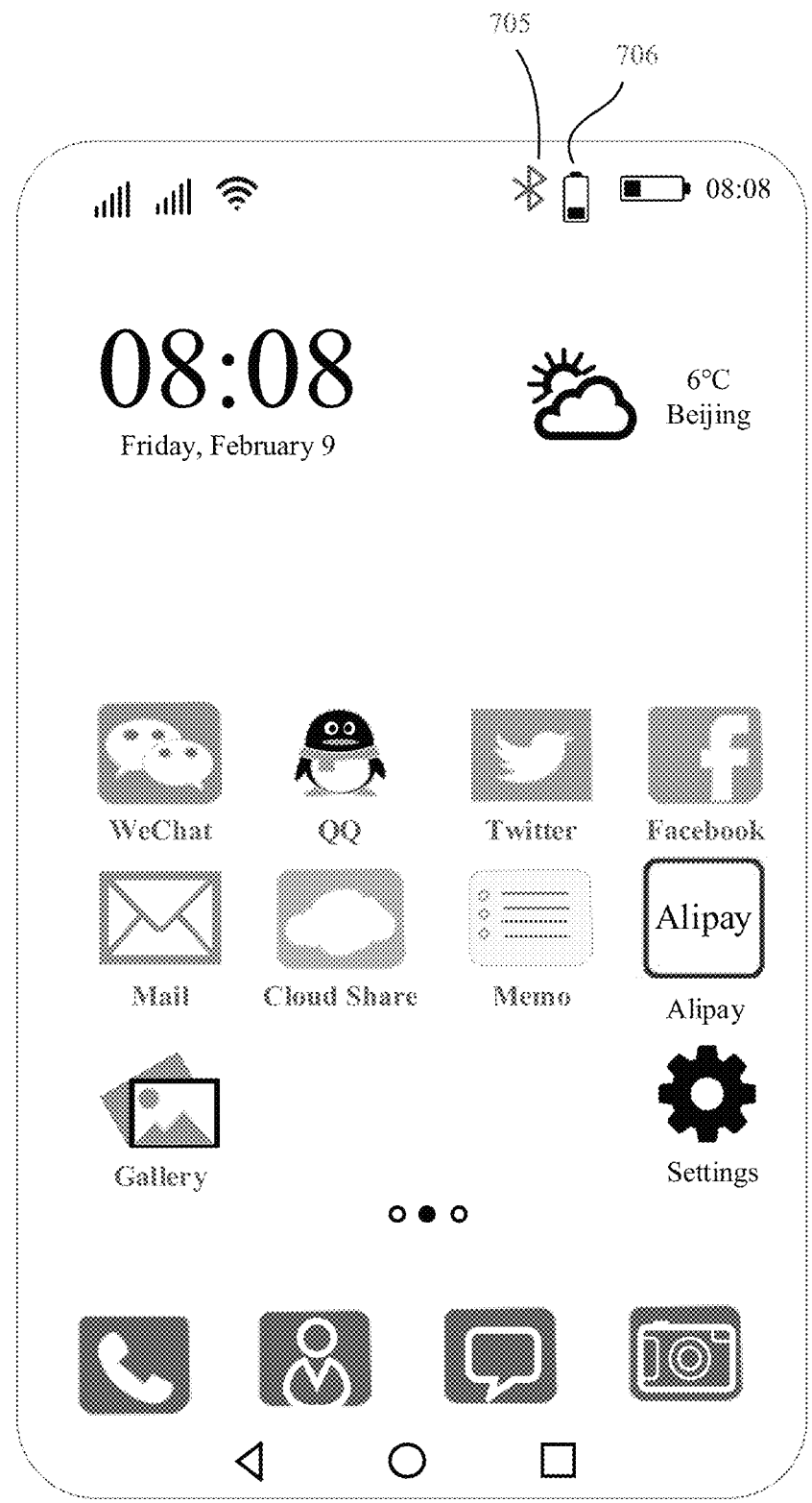
FIG. 7C shows an indicator of a Bluetooth connection displayed by an electronic device.

After the master device successfully pairs with the slave device and establishes the Bluetooth connection to the slave device, as shown in an example in FIG. 7C, the electronic device may display an indicator 705 in a status bar, and the indicator 705 may be used to indicate that the master device and the slave device are currently in a Bluetooth connection state. The indicator 705 may be referred to as a first indicator. In addition, when displaying the indicator 705, the electronic device may further display an indicator 706. The indicator 706 may be used to indicate remaining power of the slave device. The indicator 706 may be referred to as a second indicator. After the Bluetooth connection between the master device and the slave device is broken, the indicator 705 and the indicator 706 disappear accordingly. In addition to the appearances shown in FIG. 7C, the first indicator and the second indicator may alternatively present other appearances. This is not limited in this embodiment of this application.

An audio connection established between the master device and the slave device may be a call audio connection (for example, an SCO connection) or a media audio connection (for example, an A2DP connection). How the master device and the slave device negotiate sound effect processing in scenarios of the media audio connection (for example, the A2DP connection) and the call audio connection (for example, the SCO connection) is described in detail in the following embodiments.

S102: The master device may send a query command to the slave device, to query a sound effect processing capability of the slave device.

The query command may be an echo request (ECHO request) in L2CAP, may be an extended command of another type of L2CAP, may be an extended AT command in the HFP protocol, or may be another customized extended command. This is not limited in this application. Signaling implementation of the request is described in detail in the following embodiments. Details are not described herein.

S103: The slave device feeds back, to the master device, indication information (such as a manufacturer and a product model) of the sound effect processing capability of the slave device.

The indication information may be carried in messages such as an echo response (ECHO response) and an extended AT response. For details, refer to the following embodiments.

S104: The master device may determine, based on the indication information fed back by the slave device, whether the master device and the slave device support joint sound effect processing.

The indication information may include device parameters such as the manufacturer and the product model of the slave device. These parameters may be used to indicate a sound effect processing algorithm used by the slave device, and reflect the sound effect processing capability of the slave device. Therefore, the indication information may be referred to as indication information of the sound effect processing capability of the slave device and the sound effect processing algorithm used by the slave device.

Herein, whether the master device and the slave device support joint sound effect processing may include the following three cases.

Case 1: The master device and the slave device do not support joint sound effect processing, and the slave device does not support sound effect processing. For details, refer to step S105.

Specifically, when the master device may determine, based on the device parameters such as the manufacturer and the product model that are fed back by the slave device, that the slave device does not have the sound effect processing capability, the master device may determine that a case of negotiating sound effect processing is Case 1. Whether the slave device has the sound effect processing capability may be determined based on the device parameters such as the manufacturer and the product model that are fed back by the slave device. The master device side may find, locally or in the cloud based on device parameters such as a manufacturer and a product model of a slave device such as a headset or a speaker, whether the slave device has a sound effect processing capability such as noise reduction or echo cancellation, and a specific sound effect processing algorithm used by the slave device when the slave device has the sound effect processing capability.

Case 2: The master device and the slave device do not support joint sound effect processing, and the slave device supports sound effect processing. For details, refer to step S110.

Specifically, when the master device determines, based on the device parameters such as the manufacturer and the product model that are fed back by the slave device, that the slave device has the sound effect processing capability, if the master device cannot obtain, based on the sound effect processing algorithm used by the slave device, a sound effect processing algorithm II that is on the master device side and that adapts to a sound effect processing algorithm I on the slave device side from a plurality of sets of sound effect processing algorithms on the master device side, the master device may determine that a case of negotiating sound effect processing is Case 2.

Case 3: The master device and the slave device support joint sound effect processing, and the slave device supports sound effect processing. For details, refer to step S115.

Specifically, when the master device determines, based on the device parameters such as the manufacturer and the product model that are fed back by the slave device, that the slave device supports sound effect processing, if the master device can obtain, based on a sound effect processing algorithm I used by the slave device, a sound effect processing algorithm II that adapts to the sound effect processing algorithm I from a plurality of sets of sound effect processing algorithms on the master device side, the master device may determine that a case of negotiating sound effect processing is Case 3. The sound effect processing algorithm II may be used for sound effect processing on the master device side in joint sound effect processing.

To determine the foregoing several cases, the master device may determine, in the following several manners, whether the master device side has the sound effect processing algorithm II that is on the master device side and that adapts to the sound effect processing algorithm I on the slave device side.

Manner 1: The master device performs sound effect processing on a test signal and compares processing results, to select an adaptation algorithm.

Specifically, the master device may select one set of sound effect processing algorithms from the plurality of sets of sound effect processing algorithms on the master device side, and sequentially process test audio data by using the one set of selected sound effect processing algorithms and the sound effect processing algorithm I on the slave device side. If one or more of the following conditions are met: a signal-to-noise ratio measured based on the processed test audio data is better than a first signal-to-noise ratio and a second signal-to-noise ratio, and an echo component measured based on the processed test audio data is less than a first echo component and a second echo component, the master device determines that the master device side has the sound effect processing algorithm II that adapts to the sound effect processing algorithm I. If the one or more conditions are not met, the master device continues to select a next set of sound effect processing algorithms from the plurality of sets of sound effect processing algorithms, and repeats the sound effect processing until a sound effect processing algorithm that meets the one or more conditions is selected. If none of the plurality of sets of algorithms can meet the one or more conditions, the master device may determine that the master device side does not have the sound effect processing algorithm II that adapts to the sound effect processing algorithm I on the slave device side.

The master device may further select, from the plurality of sets of sound effect processing algorithms, a sound effect processing algorithm that meets the one or more conditions and that has an optimal sound effect processing effect (for example, an optimal signal-to-noise ratio and a minimum echo component), to adapt to the sound effect processing algorithm I on the slave device side.

The first signal-to-noise ratio and the first echo component may be respectively a signal-to-noise ratio and an echo component that are measured after the test audio data is processed by using the one set of selected sound effect processing algorithms, and the second signal-to-noise ratio and the second echo component may be respectively a signal-to-noise ratio and an echo component that are measured after the test audio data is processed by using the sound effect processing algorithm I on the slave device side. The plurality of sets of sound effect processing algorithms on the master device side may be locally stored in the master device, or may be stored on a cloud server and accessed by the master device.

Manner 2: The master device queries a table to obtain an adaptation algorithm.

Specifically, the master device side may store or may access a mapping table. The mapping table may record correspondences between device parameters (device parameters such as a manufacturer and a product model) of a plurality of devices and a plurality of sets of sound effect processing algorithms. In the mapping table, a sound effect processing algorithm corresponding to a device parameter of a slave device is a sound effect processing algorithm that is in the plurality of sets of sound effect processing algorithms on the master device side and that adapts to the sound effect processing algorithm used by the slave device. One set of sound effect processing algorithms may include a plurality of sound effect processing algorithms, for example, a noise reduction algorithm and an echo suppression algorithm Certainly, one set of sound effect processing algorithms may alternatively include only one sound effect processing algorithm, for example, a noise reduction algorithm. This is not limited in this application. The mapping table may be written into a memory by the master device before delivery, may be downloaded by the master device from a server, or may be shared by another device. A source of the mapping table is not limited in this application.

Specifically, the master device side may determine whether a sound effect processing algorithm corresponding to the device parameter of the slave device exists in a first mapping table. If the sound effect processing algorithm corresponding to the device parameter of the slave device exists in the first mapping table, the master device may determine that the first device has the sound effect processing algorithm II that adapts to the sound effect processing algorithm I on the slave device side. The sound effect processing algorithm II is the sound effect processing algorithm corresponding to the device parameter of the slave device in the mapping table.

In S103, in addition to the device parameters such as the manufacturer and the product model, the indication information that is of the sound effect processing capability and that is sent by the slave device to the master device may further include a specific bit or a specific field. The specific bit or the specific field may be used to indicate whether the slave device has the sound effect processing capability. For example, when the specific bit is 0, it indicates that the slave device does not have the sound effect processing capability; or when the specific bit is 1, it indicates that the slave device has the sound effect processing capability. In this way, the master device may directly determine, based on the specific bit or the specific field, whether the slave device has the sound effect processing capability, and does not need to determine, based on the device parameters such as the manufacturer and the product model that are fed back by the slave device, whether the slave device has the sound effect processing capability. This brings higher efficiency. Further, if the master device determines, based on the specific bit or the specific field, that the slave device does not have the sound effect processing capability, that is, Case 1, the master device may directly perform, on the master device side, sound effect processing on audio data between the master device and the slave device by using a set of sound effect processing algorithms on the master device side. If the master device determines that the slave device has the sound effect processing capability, the master device further needs to determine, based on the device parameters such as the manufacturer and the product model, whether the master device and the slave device support joint sound effect processing. For details, refer to Case 2 and Case 3.

The Following Separately Describes Sound Effect Processing Processes in the Foregoing Three Cases.

Sound Effect Processing Process (S106 to S109) in Case 1:

S106: In Case 1, the master device may determine to perform, on the master device side, sound effect processing on audio data A between the master device and the slave device by using a sound effect processing algorithm III.

The sound effect processing algorithm III belongs to the foregoing plurality of sets of sound effect processing algorithms on the master device side. The sound effect processing algorithm III may be a sound effect processing algorithm used on the master device side by default, or may be a sound effect processing algorithm specially selected by the master device for Case 1.

S107: The master device may perform sound effect processing on the audio data A by using the sound effect processing algorithm III on the master device side, to obtain audio data B.

An audio connection may be established between the master device and the slave device, and the audio connection may be used to transmit the audio data A between the master device and the slave device. The audio connection may be a call audio connection (for example, an SCO connection) or a media audio connection (for example, an A2DP connection). How the master device and the slave device negotiate sound effect processing in scenarios of the media audio connection (for example, the A2DP connection) and the call audio connection (for example, the SCO connection) is described in detail in the following embodiments. Details are not described herein.

S108: The master device may send the audio data B to the slave device through the audio connection between the master device and the slave device.

S109: The slave device plays the audio data B.

In Case 1, the slave device does not support sound effect processing. After receiving the audio data B from the master device, the slave device plays the audio data B without performing sound effect processing on the audio data B.

Sound Effect Processing Process (S111 to S114) in Case 2:

S111: In Case 2, the master device may determine to perform, on the slave device side, sound effect processing on the audio data A between the master device and the slave device by using a sound effect processing algorithm IV.

The sound effect processing algorithm IV belongs to the foregoing plurality of sets of sound effect processing algorithms on the slave device side. The sound effect processing algorithm IV may be a sound effect processing algorithm used on the slave device side by default, or may be another type of sound effect processing algorithm.

S112: The master device may directly send the audio data A to the slave device through the audio connection between the master device and the slave device.

The audio connection may be established between the master device and the slave device, and the audio connection may be used to transmit the audio data A between the master device and the slave device. The audio connection may be the call audio connection (for example, the SCO connection) or the media audio connection (for example, the A2DP connection). Details are described in the following embodiments.

In Case 2, the master device determines not to use a sound effect processing function on the master device side. Therefore, the master device sends the audio data A to the slave device without performing sound effect processing on the audio data A.

S113: The slave device may perform sound effect processing on the audio data A by using the sound effect processing algorithm IV on the slave device side, to obtain audio data C.

S114: The slave device plays the audio data C.

Sound Effect Processing Process (S116 to S120) in Case 3:

S116: In Case 3, the master device selects, based on the sound effect processing algorithm I used by the slave device, the sound effect processing algorithm II that adapts to the sound effect processing algorithm I, and determines to perform, on the master device side, sound effect processing on the audio data A between the master device and the slave device by using the sound effect processing algorithm I.

Refer to step S115. The master device may obtain, locally or in the cloud, the sound effect processing algorithm II that is on the master device side and that adapts to the sound effect processing algorithm I on the slave device side. The sound effect processing algorithm II belongs to the plurality of sets of sound effect processing algorithms on the master device side. The sound effect processing algorithm II is usually a sound effect processing algorithm that is specially selected by the master device for Case 3 and that adapts to the sound effect processing algorithm I on the slave device side. For how the master device side obtains the sound effect processing algorithm that adapts to the sound effect processing algorithm I on the slave device side, refer to the foregoing content. Details are not described herein again.

S117: The master device performs sound effect processing on the audio data A by using the sound effect processing algorithm II on the master device side, to obtain audio data D.

The audio connection may be established between the master device and the slave device, and the audio connection may be used to transmit the audio data A between the master device and the slave device. The audio connection may be the call audio connection (for example, the SCO connection) or the media audio connection (for example, the A2DP connection). Details are described in the following embodiments.

S118: The master device sends the audio data D to the slave device through the audio connection between the master device and the slave device.

S119: The slave device performs sound effect processing on the audio data D by using the sound effect processing algorithm I on the slave device side, to obtain audio data E.

S120: The slave device plays the audio data E.

In Case 3, the audio data E is finally obtained after joint sound effect processing is performed on the audio data A by using the sound effect processing algorithm II on the master device side and the sound effect processing algorithm I on the slave device side.

It can be learned that, in the wireless communication method provided in this application, a sound effect processing manner between the master device and the slave device may be more flexibly selected based on the sound effect processing capability of the slave device, and joint sound effect processing between the master device and the slave device is supported, so that the master device and the slave device can fully use sound effect processing advantages of the master device and the slave device. Compared with single-side sound effect processing, effects of joint sound effect processing generally do not cancel each other out, but enhance each other. This can further improve a sound effect of audio, and meet a user's requirement on higher sound quality of audio.

Without being limited to the Bluetooth connection between the master device and the slave device, the foregoing procedures may also be based on another type of wireless communication connection between the master device and the slave device, for example, a Wi-Fi connection or a near field communication (near field communication, NFC) connection. This is not limited in this application.

The following describes in detail wireless communication methods provided in embodiments of this application.

Embodiment 1

This embodiment discusses how a master device (for example, a mobile phone or a tablet computer) and a slave device (for example, a Bluetooth headset or a Bluetooth speaker) coordinate sound effect processing in a media audio connection scenario based on signaling in Bluetooth L2CAP. Herein, the media audio connection may be, for example, an A2DP connection.

Figure 8A:
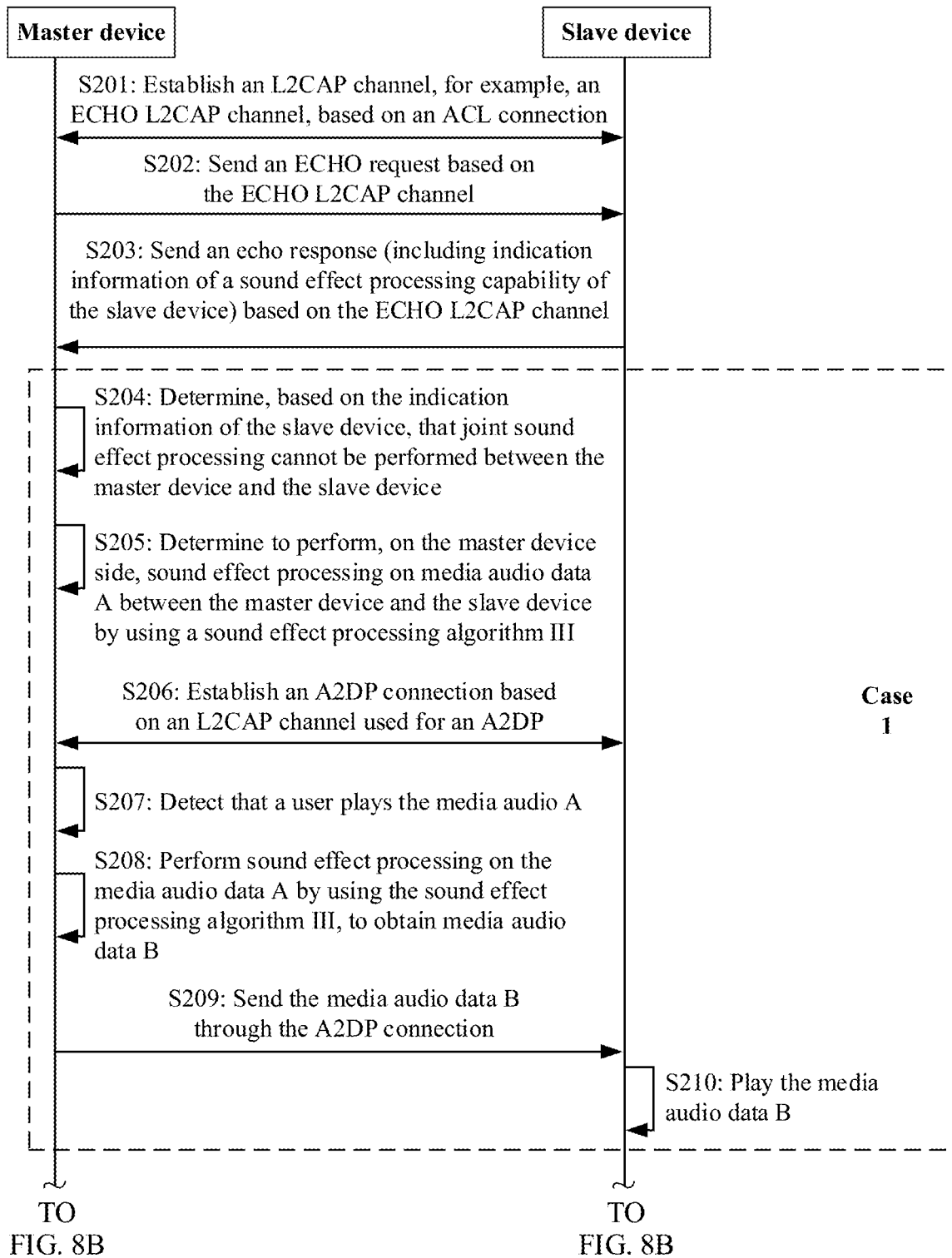
FIG. 8A to FIG. 8C show a wireless communication method according to Embodiment 1.
Figure 8B:
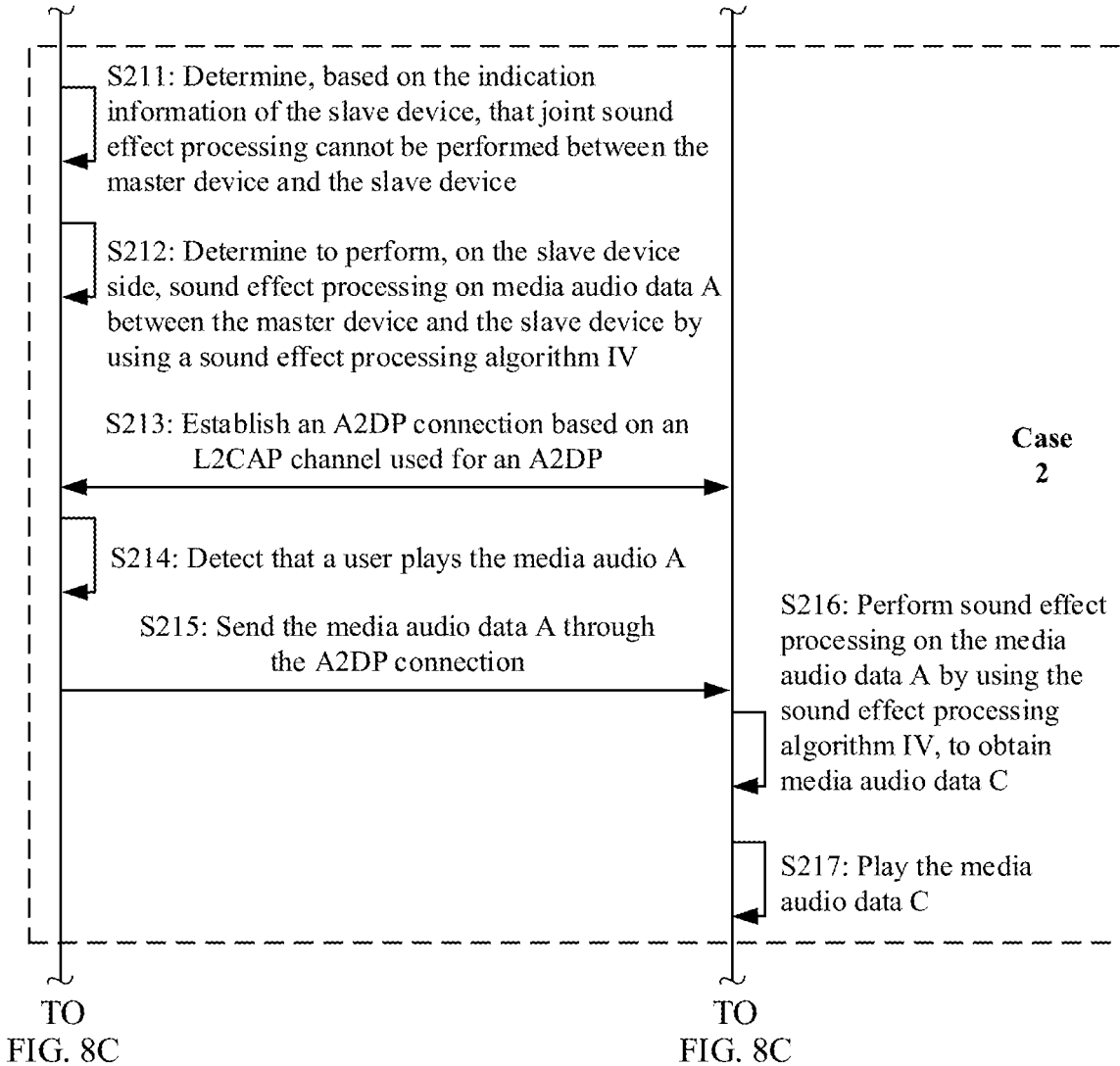
Figure 8C:
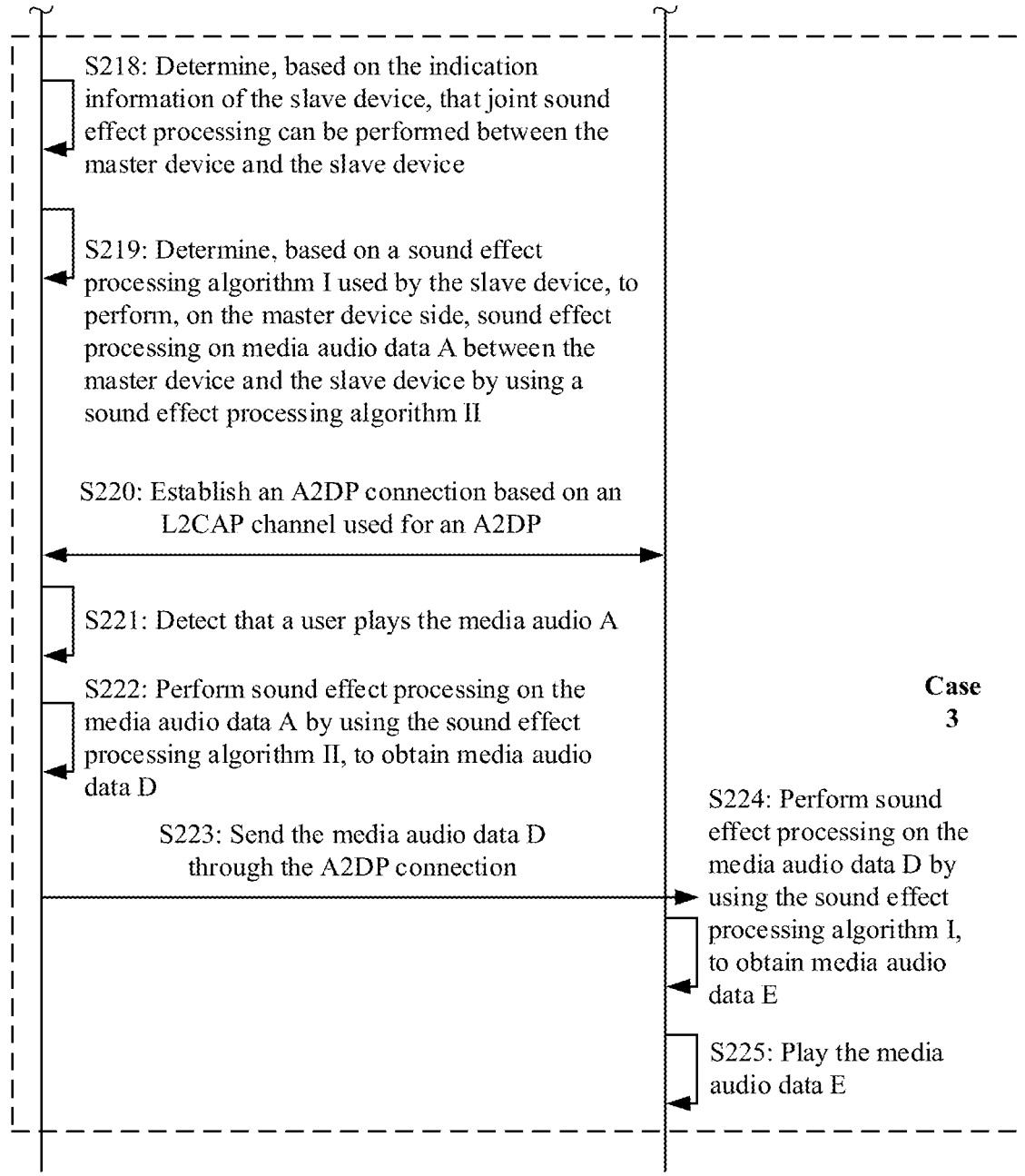

FIG. 8A to FIG. 8C show a wireless communication method according to Embodiment 1. In the method shown in FIG. 8A to FIG. 8C, a Bluetooth connection (an ACL connection) is established and maintained between the master device and the slave device. As shown in FIG. 8A to FIG. 8C, an example in which the media audio connection is the A2DP connection is used. The method may include the following steps.

S201: Establish an L2CAP channel, for example, an ECHO L2CAP channel, between the master device and the slave device based on the ACL connection.

In this embodiment, negotiation of sound effect processing between the master device and the slave device may be implemented based on the signaling in Bluetooth L2CAP. In an example, the ECHO L2CAP channel may be established, and negotiation of sound effect processing between the master device and the slave device is implemented by using an echo request (ECHO request)/echo response (ECHO response) instruction in L2CAP. Because L2CAP belongs to a Bluetooth bottom-layer connection, and may support negotiation of a result before a Bluetooth profile connection is established, the master device and the slave device may complete the negotiation before media audio data arrives.

Specifically, a format of the echo request (ECHO request)/echo response (ECHO response) instruction is shown in Table 1 and Table 2.

TABLE 1

Format of an echo request instruction

| Code = 0 × 08 (instruction code of L2CAP signaling) | Identifier (identifier) | Length (Length) |
|---|---|---|
| Data (data) | | |

TABLE 2

Format of an echo response instruction

| Code = 0 × 09 (instruction code of L2CAP signaling) | Identifier (identifier) | Length (Length) |
|---|---|---|
| Data (data) | | |

S202: The master device sends the echo request to the slave device based on the ECHO L2CAP channel.

The echo request sent by the master device is used to request to query a sound effect processing capability of the slave device.

S203: The slave device sends the echo response (including indication information of the sound effect processing capability of the slave device) to the master device based on the ECHO L2CAP channel.

In response to the echo request sent by the master device, the slave device sends the echo response to the master device. The echo response may carry the indication information of the sound effect processing capability of the slave device, for example, device parameters such as a manufacturer and a product model, and is used for subsequent negotiation of sound effect processing between the master device and the slave device.

The master device may determine, based on the indication information of the sound effect processing capability of the slave device, whether the master device and the slave device support joint sound effect processing.

The Following Describes Three Cases of Whether the Master Device and the Slave Device Support Joint Sound Effect Processing (for Details, Refer to Elated Content in the Foregoing Overall Method Procedure), and Sound Effect Processing Processes in the Three Cases.

Case 1 and Sound Effect Processing Process (S204 to S210) in Case 1:

S204: The master device may determine, based on the indication information of the slave device, that joint sound effect processing cannot be performed between the master device and the slave device.

In addition, the slave device does not support sound effect processing, that is, the master device determines that a case of negotiating sound effect processing is Case 1.

Specifically, when the master device determines, based on the indication information of the sound effect processing capability of the slave device, for example, the device parameters such as the manufacturer and the product model, that the slave device does not support sound effect processing, or an effect of performing sound effect processing by the slave device on audio data is poor, the master device may determine that a case of negotiating sound effect processing is Case 1.

S205: In Case 1, the master device may determine to perform, on the master device side, sound effect processing on media audio data A between the master device and the slave device by using a sound effect processing algorithm III.

The sound effect processing algorithm III belongs to the foregoing plurality of sets of sound effect processing algorithms on the master device side. The sound effect processing algorithm III may be a sound effect processing algorithm used on the master device side by default, or may be a sound effect processing algorithm specially selected by the master device for Case 1.

S206: Establish an A2DP connection between the master device and the slave device based on an L2CAP channel used for an A2DP.

The A2DP connection may be a stream connection established based on a Bluetooth connection and the L2CAP channel used for the A2DP. For establishment of the A2DP connection between the master device and the slave device, refer to the process of establishing the media audio connection shown in FIG. 3. Details are not described herein again.

S207: The master device detects that a user plays the media audio A.

The user may perform an operation on the master device to play the media audio A. In this case, the master device detects an operation of playing the media audio A by the user. In addition, based on an interaction reaction of components such as a sensor and a wire control of the slave device, the slave device may also detect the operation of playing the media audio A performed by the user, and feed back the operation to the master device.

S208: The master device performs sound effect processing on the media audio data A by using the sound effect processing algorithm III, to obtain media audio data B.

S209: The master device sends the media audio data B to the slave device through the A2DP connection.

The master device sends, through the A2DP connection, the media audio data B obtained after sound effect processing to the slave device.

S210: The slave device plays the media audio data B.

In Case 1, the slave device does not support sound effect processing. After receiving the media audio data B from the master device, the slave device plays the media audio data B without performing sound effect processing on the media audio data B.

Case 2 and Sound Effect Processing Process (S211 to S217) in Case 2:

S211: The master device may determine, based on the indication information of the slave device, that joint sound effect processing cannot be performed between the master device and the slave device.

However, the slave device supports sound effect processing, that is, the master device determines that a case of negotiating sound effect processing is Case 2.

Specifically, when the master device determines, based on the indication information of the sound effect processing capability of the slave device, for example, the device parameters such as the manufacturer and the product model, that the slave device supports sound effect processing, but the master device cannot obtain a sound effect processing algorithm that is on the master device side and that adapts to a sound effect processing algorithm used by the slave device, the master device may determine that a case of negotiating sound effect processing is Case 2.

S212: In Case 2, the master device may determine to perform, on the slave device side, sound effect processing on the media audio data A between the master device and the slave device by using a sound effect processing algorithm IV.

The sound effect processing algorithm IV belongs to the foregoing plurality of sets of sound effect processing algorithms on the slave device side. The sound effect processing algorithm IV may be a sound effect processing algorithm used on the slave device side by default, or may be another type of sound effect processing algorithm.

S213: Establish an A2DP connection between the master device and the slave device based on an L2CAP channel used for an A2DP.

The A2DP connection may be a stream connection established based on a Bluetooth connection and the L2CAP channel used for the A2DP. For establishment of the A2DP connection between the master device and the slave device, refer to the process of establishing the media audio connection shown in FIG. 3. Details are not described herein again.

S214: The master device detects that a user plays the media audio A.

The user may perform an operation on the master device to play the media audio A. In this case, the master device detects an operation of playing the media audio A by the user. In addition, based on the interaction reaction of the components such as the sensor and the wire control of the slave device, the slave device may also detect the operation of playing the media audio A performed by the user, and feed back the operation to the master device.

S215: The master device sends the media audio data A to the slave device through the A2DP connection.

In Case 2, the master device determines not to use a sound effect processing function on the master device side. Therefore, the master device sends the media audio data A to the slave device without performing sound effect processing on the media audio data A.

S216: The master device performs sound effect processing on the media audio data A by using the sound effect processing algorithm IV, to obtain media audio data C.

S217: The slave device plays the media audio data C.

Case 3 and Sound Effect Processing Process (S218 to S225) in Case 3:

S218: The master device determines, based on the indication information of the slave device, that joint sound effect processing can be performed between the master device and the slave device.

Specifically, when the master device determines, based on the device parameters such as the manufacturer and the product model that are fed back by the slave device, that the slave device supports sound effect processing, if the master device can obtain, based on a sound effect processing algorithm I used by the slave device, a sound effect processing algorithm II that adapts to the sound effect processing algorithm I from a plurality of sets of sound effect processing algorithms on the master device side, the master device may determine that a case of negotiating sound effect processing is Case 3. The sound effect processing algorithm II may be used for sound effect processing on the master device side in joint sound effect processing.

S219: In Case 3, the master device selects, based on the sound effect processing algorithm I used by the slave device, the sound effect processing algorithm II that adapts to the sound effect processing algorithm I, and determines to perform, on the master device side, sound effect processing on the media audio data A between the master device and the slave device by using the sound effect processing algorithm I.

The master device may obtain, locally or in the cloud, the sound effect processing algorithm II that is on the master device side and that adapts to the sound effect processing algorithm I on the slave device side. The sound effect processing algorithm II belongs to the plurality of sets of sound effect processing algorithms on the master device side. The sound effect processing algorithm II is usually a sound effect processing algorithm that is specially selected by the master device for Case 3 and that adapts to the sound effect processing algorithm I on the slave device side. The sound effect processing algorithm II on the master device side cooperates with the sound effect processing algorithm I on the slave device side to process the media audio. The sound effect processing algorithm II on the master device side and the sound effect processing algorithm I on the slave device side cooperate with each other and complement each other, so that a better sound effect can be presented.

S220: Establish an A2DP connection between the master device and the slave device based on an L2CAP channel used for an A2DP.

The A2DP connection may be a stream connection established based on a Bluetooth connection and the L2CAP channel used for the A2DP. For establishment of the A2DP connection between the master device and the slave device, refer to the process of establishing the media audio connection shown in FIG. 3. Details are not described herein again.

S221: The master device detects that a user plays the media audio A.

Similarly, the user may perform an operation on the master device to play the media audio A. In this case, the master device detects an operation of playing the media audio A by the user. In addition, based on the interaction reaction of the components such as the sensor and the wire control of the slave device, the slave device may also detect the operation of playing the media audio A performed by the user, and feed back the operation to the master device.

S222: The master device performs sound effect processing on the media audio data A by using the sound effect processing algorithm II, to obtain media audio data D.

S223: The master device sends the media audio data D to the slave device through the A2DP connection.

The master device sends, through the A2DP connection, the media audio data D obtained after sound effect processing to the slave device.

S224: The master device performs sound effect processing on the media audio data D by using the sound effect processing algorithm I, to obtain media audio data E.

S225: The slave device plays the media audio E.

In Case 3, the media audio data E is finally obtained after joint sound effect processing is performed on the media audio data A by using the sound effect processing algorithm II on the master device side and the sound effect processing algorithm I on the slave device side.

In the media audio connection scenario, L2CAP can interact with a Bluetooth upper-layer audio profile, so that the upper-layer audio profile can obtain a negotiation result. In addition, L2CAP belongs to a Bluetooth bottom-layer connection, and may support negotiation of a result before a Bluetooth profile connection is established, to ensure that the negotiation is completed before the media audio data arrives and perform sound effect processing on the media audio data in time.

In addition, in addition to ECHO L2CAP, the master device and the slave device may further establish the L2CAP channel based on another type of L2CAP to perform the foregoing sound effect processing negotiation.

Embodiment 2

This embodiment discusses how a master device (for example, a mobile phone or a tablet computer) and a slave device (for example, a Bluetooth headset or a Bluetooth speaker) coordinate sound effect processing in a call audio connection scenario according to an AT command in the Bluetooth HFP protocol. As a part of the HFP protocol, the AT command is used to transmit control signaling between an AG (Audio Gateway) and an HF (Hands-Free Unit) through an RFCOMM (radio frequency communication) channel. An encoding format of the AT command is an ASCII character. Herein, the call audio connection may be, for example, an SCO connection. Different from media audio connection, establishment of the SCO connection needs to be triggered by a user operation (answering a call) or an internal event. That is, the call audio connection needs to be established only when there is a call audio service.

Figure 9A:
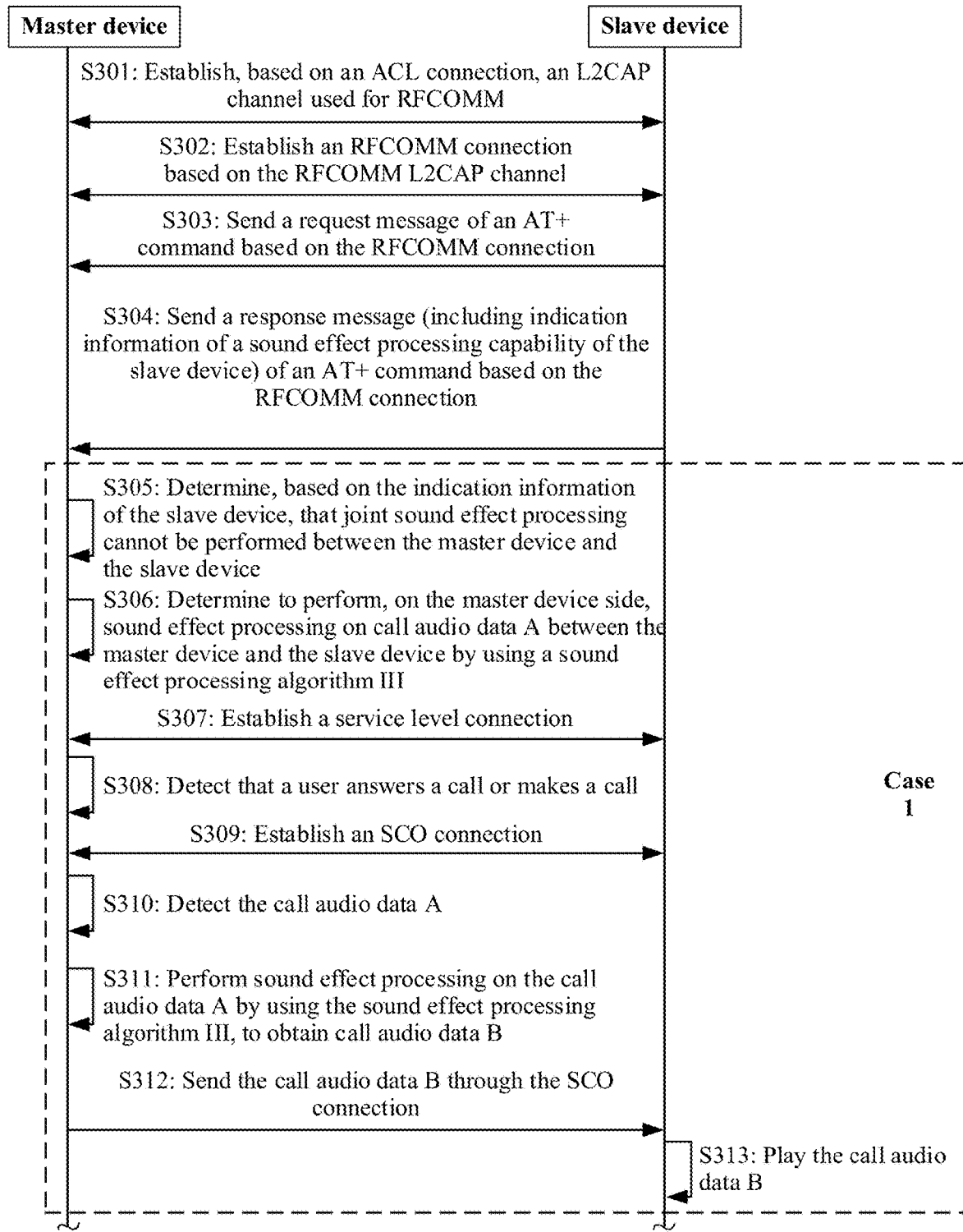
FIG. 9A to FIG. 9C show a wireless communication method according to Embodiment 2.
Figure 9B:
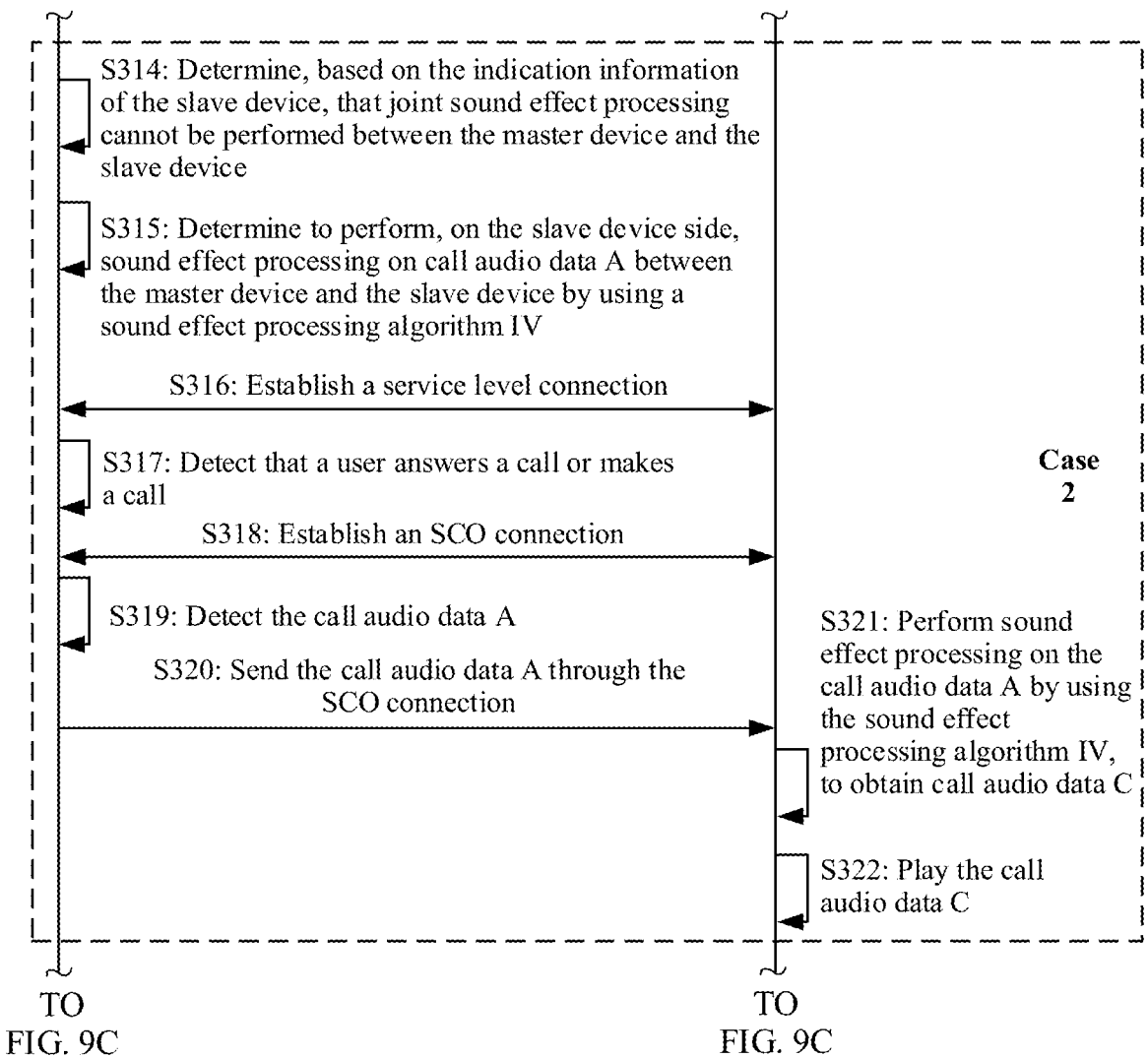
Figure 9C:
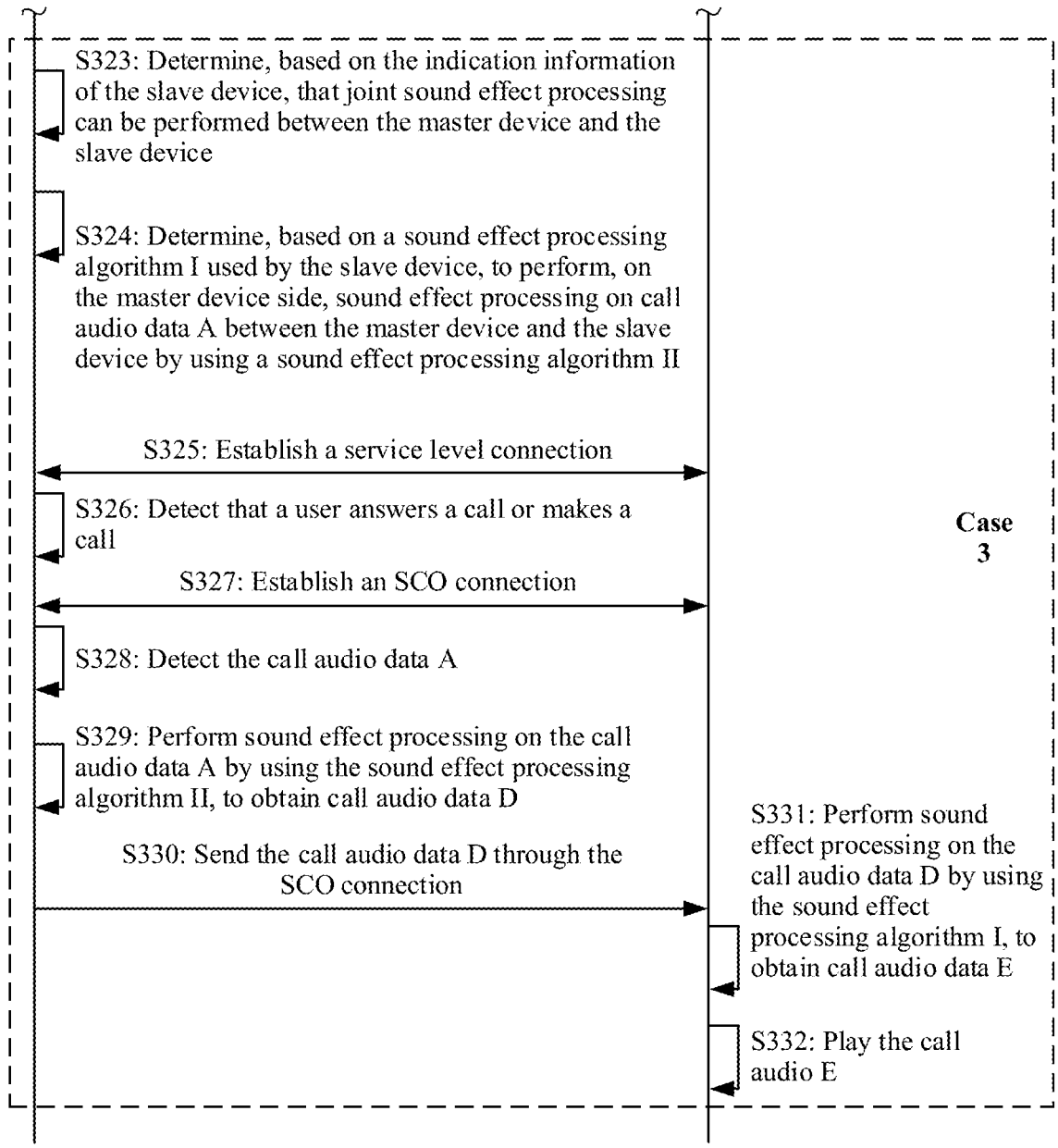

FIG. 9A to FIG. 9C show a wireless communication method according to Embodiment 2. In the method shown in FIG. 9A to FIG. 9C, a Bluetooth connection (an ACL connection) is established and maintained between the master device and the slave device. As shown in FIG. 9A to FIG. 9C, an example in which the call audio connection is the SCO connection is used. The method may include the following steps.

S301: Establish, based on the ACL connection, an L2CAP channel used for RFCOMM between the master device and the slave device.

For specific content, refer to step 1 in the process of establishing the call audio control connection shown in FIG. 5. Details are not described herein again.

S302: Establish an RFCOMM connection between the master device and the slave device based on the RFCOMM L2CAP channel.

For specific content, refer to step 2 in the process of establishing the call audio control connection shown in FIG. 5. Details are not described herein again.

S303: The master device sends a specific extended AT command to the slave device based on the RFCOMM connection, to query device parameters such as a manufacturer and a product model of the slave device.

The extended AT command is implemented based on a command line of the ASCII character. A format of the extended AT command is as follows: AT+<CMD>[op][para-1, para-2, para-3, . . . ]<CR>.

In the preceding format. < > indicates a mandatory part, and [ ] indicates an optional part. AT+ is a prefix of the command information. CMD is a command character string. [op] is a command operator, which specifies parameter setting or query. "=" indicates the parameter setting, and "NULL" indicates the query. [para-n] is an input for the parameter setting, which is not required for the query. <CR> is an end character, indicating a carriage return. The ASCII character is 0x0a or 0x0d.

A format of a response message corresponding to the extended AT command is: +<RSP>[op] [para-1, para-2, para-3, . . . ]<CR><LF><CR><LF>.

In the preceding format, + is a prefix of the response message. RSP is a response character string, including: "ok" indicates success, and "ERR" indicates failure. [op] is =. [para-n] is a returned parameter during query or an error code when an error occurs. <CR> is an end character, indicating a carriage return. The ASCII character is 0x0d. <LF> is an end character, indicating a line feed. The ASCII character is 0x0a.

For example, an AT command "AT+AAID" may be customized as an AT+ command for the master device to query indication information of a sound effect processing capability of the slave device. The character "AAID" is a customized command character string shown in an example. A form and content of the extended AT command are not limited in this embodiment.

S304: The slave device may send a response message (carrying the indication information of the sound effect processing capability of the slave device) of the specific extended AT command to the slave device based on the RFCOMM connection.

For the format of the response message of the specific extended AT command, refer to related content in S303. Details are not described herein again.

The master device may determine, based on the device parameters such as the manufacturer and the product model that are fed back by the slave device, whether the slave device has the sound effect processing capability, and whether the master device and the slave device support joint sound effect processing, that is, whether a sound effect processing algorithm on the master device side adapts to a sound effect processing algorithm on the slave device side.

The Following Describes Three Cases of Whether the Master Device and the Slave Device Support Joint Sound Effect Processing (for Details, Refer to Related Content in the Foregoing Overall Method Procedure), and Sound Effect Processing Processes in the Three Cases.

Case 1 and sound effect processing process (S305 to S213) in Case 1:

S305: The master device may determine, based on the indication information of the slave device, that joint sound effect processing cannot be performed between the master device and the slave device.

In addition, the slave device does not support sound effect processing, that is, the master device determines that a case of negotiating sound effect processing is Case 1.

Specifically, when the master device determines, based on the indication information of the sound effect processing capability of the slave device, for example, the device parameters such as the manufacturer and the product model, that the slave device does not support sound effect processing, or an effect of performing sound effect processing by the slave device on audio data is poor, the master device may determine that a case of negotiating sound effect processing is Case 1.

S306: In Case 1, the master device may determine to perform, on the master device side, sound effect processing on call audio data A between the master device and the slave device by using a sound effect processing algorithm III.

The sound effect processing algorithm III belongs to the foregoing plurality of sets of sound effect processing algorithms on the master device side. The sound effect processing algorithm III may be a sound effect processing algorithm used on the master device side by default, or may be a sound effect processing algorithm specially selected by the master device for Case 1.

S307: Establish a service level connection between the master device and the slave device.

For specific content, refer to step 3 in the process of establishing the call audio control connection shown in FIG. 5. Details are not described herein again.

S308: The master device detects that a user answers a call or makes a call.

The user may perform an operation on the master device to answer a call or make a call. In this case, the master device detects an operation of answering a call or making a call by the user. In addition, based on an interaction reaction of components such as a sensor and a wire control of the slave device, the slave device may also detect the operation of answering a call or making a call by the user, and feed back the operation to the master device.

S309: Establish an SCO connection between the master device and the slave device.

For an SCO connection establishment process, refer to related content in FIG. 4. Details are not described herein again.

S310: The master device detects the call audio data A.

S311: The master device performs sound effect processing on the call audio data A by using the sound effect processing algorithm III, to obtain media audio data B.

S312: The master device sends the call audio data B to the slave device through the SCO connection.

The master device sends, through the SCO connection, the call audio data B obtained after sound effect processing to the slave device.

S313: The slave device plays the call audio data B.

In Case 1, the slave device does not support sound effect processing. After receiving the call audio data B from the master device, the slave device plays the call audio data B without performing sound effect processing on the call audio data B.

Case 2 and Sound Effect Processing Process (S314 to S322) in Case 2:

S314: The master device may determine, based on the indication information of the slave device, that joint sound effect processing cannot be performed between the master device and the slave device.

However, the slave device supports sound effect processing, that is, the master device determines that a case of negotiating sound effect processing is Case 2.

Specifically, when the master device determines, based on the indication information of the sound effect processing capability of the slave device, for example, the device parameters such as the manufacturer and the product model, that the slave device supports sound effect processing, but the master device cannot obtain a sound effect processing algorithm that is on the master device side and that adapts to a sound effect processing algorithm used by the slave device, the master device may determine that a case of negotiating sound effect processing is Case 2.

S315: In Case 2, the master device may determine to perform, on the slave device side, sound effect processing on the call audio data A between the master device and the slave device by using a sound effect processing algorithm IV.

The sound effect processing algorithm IV belongs to the foregoing plurality of sets of sound effect processing algorithms on the slave device side. The sound effect processing algorithm IV may be a sound effect processing algorithm used on the slave device side by default, or may be another type of sound effect processing algorithm.

S316: Establish a service level connection between the master device and the slave device.

For specific content, refer to step 3 in the process of establishing the call audio control connection shown in FIG. 5. Details are not described herein again.

S317: The master device detects that a user answers a call or makes a call.

The user may perform an operation on the master device to answer a call or make a call. In this case, the master device detects an operation of answering a call or making a call by the user. In addition, based on the interaction reaction of the components such as the sensor and the wire control of the slave device, the slave device may also detect the operation of answering the call or making the call by the user, and feed back the operation to the master device.

S318: Establish an SCO connection between the master device and the slave device.

For the SCO connection establishment process, refer to the related content in FIG. 4. Details are not described herein again.

S319: The master device detects the call audio data A.

S320: The master device sends the call audio data A to the slave device through the SCO connection.

In Case 2, the master device determines not to use a sound effect processing function on the master device side. Therefore, the master device sends the call audio data A to the slave device without performing sound effect processing on the call audio data A.

S321: The master device performs sound effect processing on the call audio data A by using the sound effect processing algorithm IV, to obtain call audio data C.

S322: The slave device plays the call audio data C.

Case 3 and Sound Effect Processing Process (S323 to S332) in Case 3:

S323: The master device determines, based on the indication information of the slave device, that joint sound effect processing can be performed between the master device and the slave device.

Specifically, when the master device determines, based on the device parameters such as the manufacturer and the product model that are fed back by the slave device, that the slave device supports sound effect processing, if the master device can obtain, based on a sound effect processing algorithm I used by the slave device, a sound effect processing algorithm II that adapts to the sound effect processing algorithm I from a plurality of sets of sound effect processing algorithms on the master device side, the master device may determine that a case of negotiating sound effect processing is Case 3. The sound effect processing algorithm II may be used for sound effect processing on the master device side in joint sound effect processing. For details, refer to step S115.

S324: The master device selects, based on the sound effect processing algorithm I used by the slave device, the sound effect processing algorithm II that adapts to the sound effect processing algorithm I, and determines to perform, on the master device side, sound effect processing on the call audio data A between the master device and the slave device by using the sound effect processing algorithm II.

The master device may obtain, locally or in the cloud, the sound effect processing algorithm II that is on the master device side and that adapts to the sound effect processing algorithm I on the slave device side. The sound effect processing algorithm II belongs to the plurality of sets of sound effect processing algorithms on the master device side. The sound effect processing algorithm II is usually a sound effect processing algorithm that is specially selected by the master device for Case 3 and that adapts to the sound effect processing algorithm I on the slave device side. The sound effect processing algorithm II on the master device side cooperates with the sound effect processing algorithm I on the slave device side to process the call audio. The sound effect processing algorithm II on the master device side and the sound effect processing algorithm I on the slave device side cooperate with each other and complement each other, so that a better sound effect can be presented.

S325: Establish a service level connection between the master device and the slave device.

For specific content, refer to step 3 in the process of establishing the call audio control connection shown in FIG. 5. Details are not described herein again.

S326: The master device detects that a user answers a call or makes a call.

Similarly, the user may perform an operation on the master device to answer a call or make a call. In this case, the master device detects an operation of answering a call or making a call by the user. In addition, based on the interaction reaction of the components such as the sensor and the wire control of the slave device, the slave device may also detect the operation of answering the call or making the call by the user, and feed back the operation to the master device.

S327: Establish an SCO connection between the master device and the slave device.

For the SCO connection establishment process, refer to the related content in FIG. 4. Details are not described herein again.

S328: The master device detects the call audio data A.

S329: The master device performs sound effect processing on the call audio data A by using the sound effect processing algorithm II, to obtain call audio data D.

S330: The master device sends the call audio data D to the slave device through the SCO connection.

The master device sends, through the SCO connection, the call audio data D obtained after sound effect processing to the slave device.

S331: The master device performs sound effect processing on the call audio data D by using the sound effect processing algorithm I, to obtain call audio data E.

S332: The slave device plays the call audio data E.

In Case 3, the call audio data E is finally obtained after joint sound effect processing is performed on the call audio data A by using the sound effect processing algorithm II on the master device side and the sound effect processing algorithm I on the slave device side.

In addition, when the master device or the slave device detects that the call is ended, the SCO connection is broken accordingly.

In the call audio connection scenario, the master device and the slave device perform negotiation of sound effect processing by using the AT command, so that implementation efficiency is high. In addition, the master device and the slave device can negotiate a result before the service level connection is established, to ensure that the negotiation is completed before the user answers the call or makes the call, perform sound effect processing on the call audio data in time, and improve quality of the call audio.

In some embodiments, to reduce power consumption of the master device side and the slave device, the master device may further refine sound effect processing processes on both master device and slave device sides based on remaining power of the master device and the slave device.

In Case 1, only the master device side performs sound effect processing on the audio data. When finding that remaining power of the master device is less than a specific value, for example, less than 10%, the master device may disable the sound effect processing algorithm on the master device side, to save power.

In Case 2, only the slave device side performs sound effect processing on the audio data. When finding that remaining power of the slave device is less than a specific value, for example, less than 10%, the master device may send a notification to the slave device, to notify the slave device not to perform sound effect processing any more, or the slave device actively disables a sound effect processing function of the slave device, to save power of the slave device.

In Case 3, the master device and the slave device support joint sound effect processing, and the master device side and the slave device side collaborate to perform sound effect processing on the audio data. If it is found that power of the master device or power of the slave device is less than a specific value, for example, less than 10%, joint sound effect processing may be discarded. After joint sound effect processing is discarded, power consumption reduction is comprehensively considered. If the power of the slave device is low, sound effect processing is performed on the audio data by using the sound effect processing algorithm on only the side of the master device with sufficient power. If the power of the master device is low, sound effect processing is performed on the audio data by using the sound effect processing algorithm on only the side of the slave device with sufficient power. If both the power of the master device and the power of the slave device are low, the sound effect processing functions are disabled on both the master device and slave device sides, to reduce power consumption and save power.

In addition, an embodiment of this application further provides a wireless communication method, applied to a Bluetooth low energy connection case. Specifically, different from the foregoing embodiments, in the Bluetooth low energy connection case, a slave device may send a BLE broadcast, where the broadcast may include related parameters of the slave device, for example, a name of the slave device, a manufacturer of the slave device, and a service UUID of the slave device. After finding the broadcast, a master device initiates a connection request. After the connection is established, the master device can obtain the parameters of the slave device. Alternatively, when the BLE connection is established, the master device and the slave device negotiate sound effect processing by using an extended command. Bluetooth low energy supports the negotiation of sound effect processing between the master device and the slave device through the broadcast, so that efficient interaction can be implemented with lower power consumption.

The following describes an example of an electronic device 10 provided in an embodiment of this application. The electronic device 10 may be implemented as the master device mentioned in the foregoing embodiments, and may be the electronic device 101 in the wireless audio system 100 shown in FIG. 1A or the electronic device 201 in the wireless audio system 200 shown in FIG. 2A. The electronic device 10 may be usually used as an audio source (audio source), for example, a mobile phone or a tablet computer, and may transmit audio data to another audio receiver device (audio sink), for example, a headset or a speaker. In this way, the another audio receiver device may convert the audio data into sound. In some scenarios, the electronic device 10 may also be used as an audio receiver (audio sink) to receive audio data (for example, audio data that is converted from sound of a user and that is collected by a headset) transmitted by another device audio source (for example, the headset having a microphone).

Figure 10:
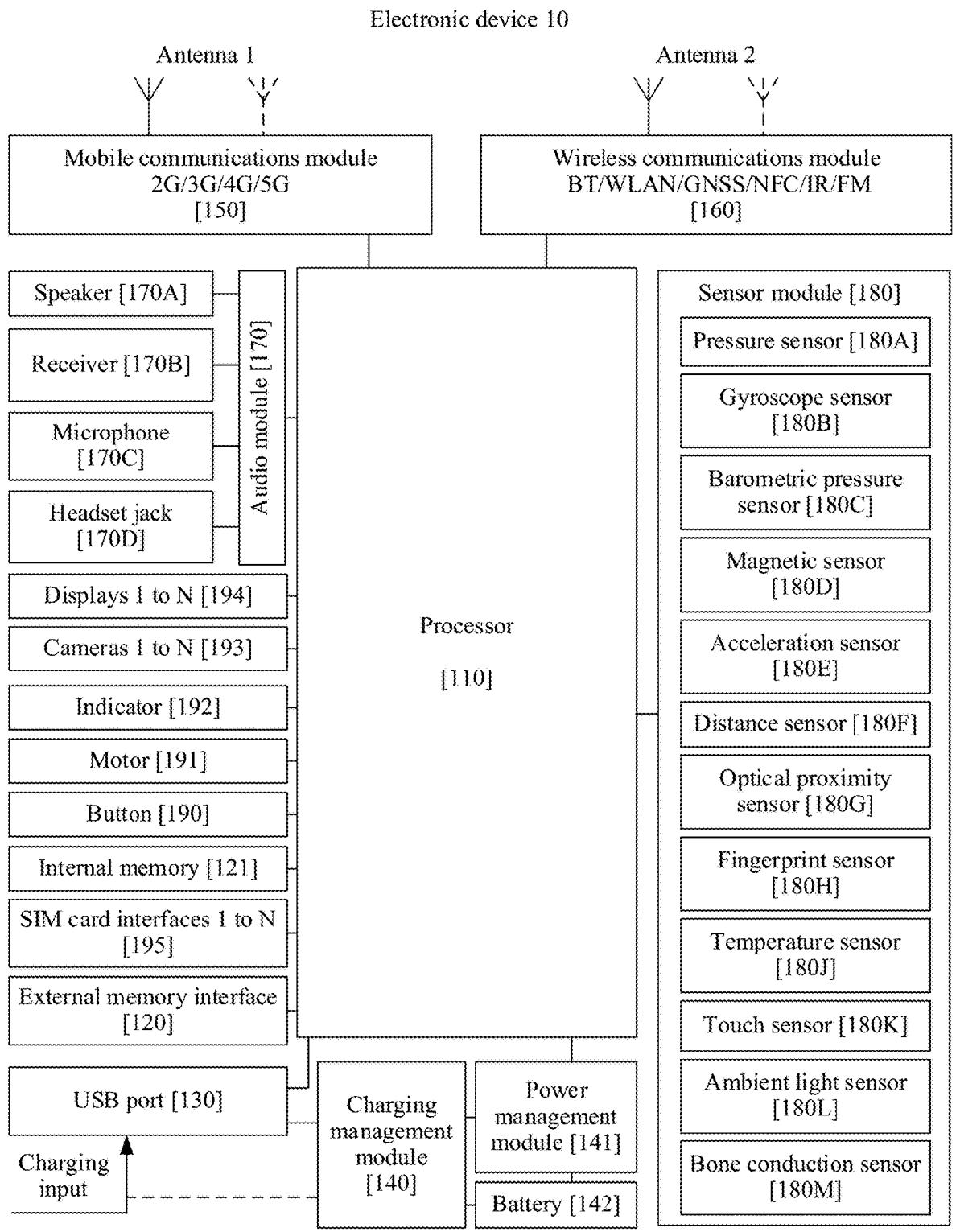
FIG. 10 shows a structure of an electronic device.

FIG. 10 is a schematic diagram of a structure of the electronic device 10.

The electronic device 10 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 10. In some other embodiments of this application, the electronic device 10 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. In some embodiments, the electronic device 10 may alternatively include one or more processors 110.

The controller may be a nerve center and a command center of the electronic device 10. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves efficiency of the electronic device 10.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) port, and/or the like. An interface connection relationship between the modules that is shown in this embodiment of the present invention is merely an example for description, and does not constitute a limitation on the structure of the electronic device 10. In some other embodiments, the electronic device 10 may alternatively use an interface connection manner different from that in the foregoing embodiment, or a combination of a plurality of interface connection manners.

A wireless communication function of the electronic device 10 may be implemented by using the antenna 1, the antenna 2, the mobile communications module 150, the wireless communications module 160, the modem processor, the baseband processor, and the like.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system. GNSS), frequency modulation (frequency modulation, FM), a near field communication (near field communication, NFC) technology, an infrared (infrared, IR) technology, or the like and that is applied to the electronic device 10. The wireless communications module 160 may be one or more components integrating at least one communication processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2. For example, the wireless communications module 160 may include a Bluetooth module and a Wi-Fi module.

In some embodiments, the antenna 1 and the mobile communications module 150 in the electronic device 10 are coupled, and the antenna 2 and the wireless communications module 160 in the electronic device 10 are coupled, so that the electronic device 10 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution. LTE), BT, a GNSS, a WLAN, NFC, FM, an IR technology, and/or the like. The GNSS may include a global positioning system (global positioning system. GPS), a global navigation satellite system (global navigation satellite system, GLONASS), a BeiDou navigation satellite system (BeiDou navigation satellite system, BDS), a quasi-zenith satellite system (quasi-zenith satellite system. QZSS), and/or a satellite based augmentation system (satellite based augmentation systems, SBAS).

The electronic device 10 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 10 may include one or N displays 194, where N is a positive integer greater than 1.

The NPU is a neural-network (neural-network, NN) computing processor. The NPU quickly processes input information with reference to a structure of a biological neural network, for example, with reference to a transfer mode between human brain neurons, and may further continuously perform self-learning. Applications such as intelligent cognition of the electronic device 10 may be implemented through the NPU, for example, image recognition, facial recognition, speech recognition, and text understanding.

The external memory interface 120 may be configured to connect to an external memory card, for example, a Micro SD card, to extend a storage capability of the electronic device 10. The external storage card communicates with the processor 110 through the external memory interface 120, to implement a data storage function. For example, data such as music, a photo, and a video is stored in the external storage card.

The internal memory 121 may be configured to store one or more computer programs, and the one or more computer programs include instructions. The processor 110 may run the instructions stored in the internal memory 121, so that the electronic device 10 performs the data sharing method provided in some embodiments of this application, various function applications, data processing, and the like. The internal memory 121 may include a program storage area and a data storage area. The program storage area may store an operating system. The program storage area may further store one or more applications (such as Gallery and Contacts), and the like. The data storage area may store data (for example, an image and a contact) created during use of the electronic device 10, and the like. In addition, the internal memory 121 may include a high-speed random access memory, and may further include a nonvolatile memory, for example, at least one magnetic disk storage device, a flash memory device, a universal flash storage (universal flash storage, UFS), or the like.

The electronic device 10 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The speaker 170A, also referred to as a "horn", is configured to convert an audio electrical signal into a sound signal. The electronic device 10 may listen to music or answer a hands-free call by using the speaker 170A.

The receiver 170B, also referred to as an "earpiece", is configured to convert the audio electrical signal into the sound signal. When a call is answered or voice information is received by using the electronic device 10, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to input the sound signal to the microphone 170C. At least one microphone 170C may be disposed in the electronic device 10. In some other embodiments, two microphones 170C may be disposed in the electronic device 10, to collect a sound signal and implement a noise reduction function. In some other embodiments, three, four, or more microphones 170C may alternatively be disposed in the electronic device 10, to collect a sound signal, reduce noise, further identify a sound source, implement a directional recording function, and the like.

The headset jack 170D is configured to connect to a wired headset. The headset jack 170D may be the USB port 130, or may be a 3.5 mm open mobile terminal platform (open mobile terminal platform, OMTP) standard interface or cellular telecommunications industry association of the USA (cellular telecommunications industry association of the USA. CTIA) standard interface.

The button 190 includes a power button, a volume button, and the like. The button 190 may be a mechanical button, or may be a touch button. The electronic device 10 may receive a key input, and generate a key signal input related to a user setting and function control of the electronic device 10. The motor 191 may generate a vibration prompt. The motor 191 may be configured to provide an incoming call vibration prompt, or may be configured to provide a touch vibration feedback. The indicator 192 may be an indicator lamp, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the electronic device 10. The electronic device 10 may support one or N SIM card interfaces, where N is a positive integer greater than 1. The SIM card interface 195 may support a nano-SIM card, a micro-SIM card, a SIM card, and the like. In some embodiments, the electronic device 10 uses an eSIM, that is, an embedded SIM card. The eSIM card may be embedded in the electronic device 10, and cannot be separated from the electronic device 10.

The electronic device 10 shown in FIG. 10 as an example may display, by using the display 194, user interfaces described in the following embodiments. The electronic device 10 may detect a touch operation on each user interface by using the touch sensor 180K, for example, a tap operation (for example, a touch operation and a double-tap operation on an icon) on each user interface, for another example, a slide-up or slide-down operation or an operation of drawing a circle gesture on each user interface. In some embodiments, the electronic device 10 may detect, by using the gyroscope sensor 180B, the acceleration sensor 180E, or the like, a motion gesture made by the user by holding the electronic device 10, for example, shaking of the electronic device. In some embodiments, the electronic device 10 may detect a non-touch gesture operation by using the camera 193 (for example, a 3D camera or a depth camera).

In some implementations, a terminal application processor (AP) included in the electronic device 10 may implement a host in a Bluetooth protocol framework, a Bluetooth (BT) module included in the electronic device 10 may implement a controller in the Bluetooth protocol framework, and the host and the controller communicate with each other through an HCI. That is, functions of the Bluetooth protocol framework are distributed on two chips.

In some other embodiments, the terminal application processor (AP) of the electronic device 10 may implement the host and the controller in the Bluetooth protocol framework. That is, all functions of the Bluetooth protocol framework are placed on a same chip. That is, the host and controller are placed on the same chip. Because the host and controller are placed on the same chip, the physical HCI is unnecessary, and the host and controller directly interact through an application programming interface API.

The following describes an example of an audio receiver device 300 provided in an embodiment of this application. The audio receiver device 300 may be implemented as the slave device mentioned in the foregoing embodiments, for example, a Bluetooth headset, and may be the audio output device 106 in the wireless audio system 100 shown in FIG. 1A or the audio output device 202 or the audio output device 203 in the wireless audio system 200 shown in FIG. 2A. The audio receiver (audio sink) device 300, such as a headset or a speaker, may transmit audio data to another audio source (audio source), such as a mobile phone or a tablet computer, and may convert the received audio data into sound. In some scenarios, if a sound collection device such as a microphone/receiver is configured, the audio receiver device 300 may also be used as an audio source (audio source) to transmit audio data (for example, audio data converted from voice of a user collected by a headset) to an audio receiver (audio sink) (for example, a mobile phone) of another device.

The audio receiver device 300 may be a Bluetooth headset, including a left earbud and a right earbud. The Bluetooth headset may be a neckband Bluetooth headset, or may be a TWS Bluetooth headset.

Figure 11:
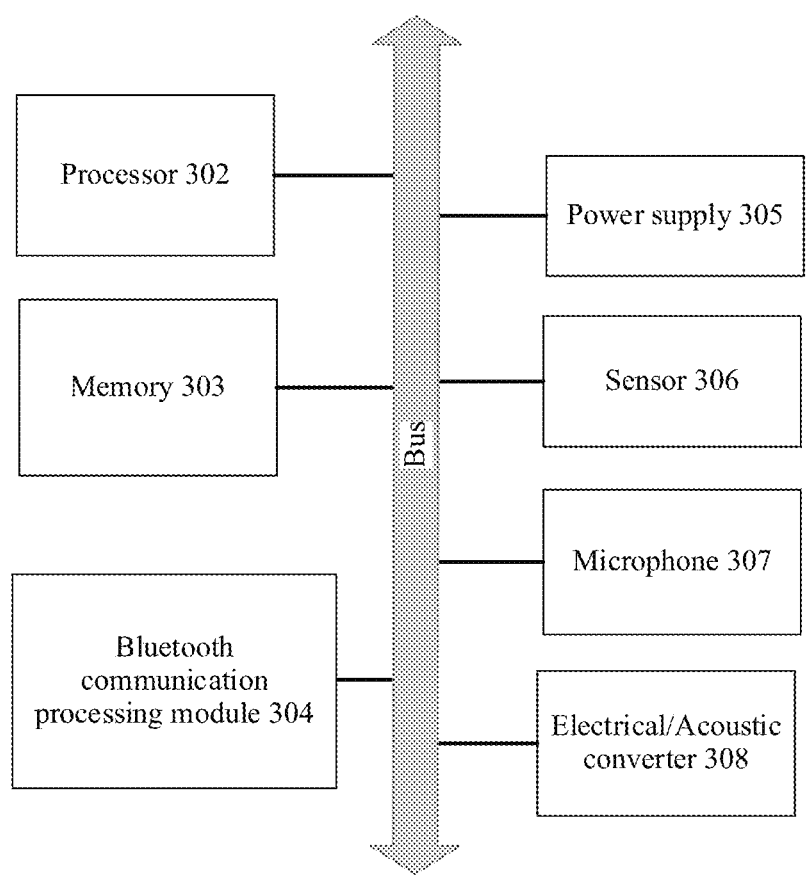
FIG. 11 shows a structure of an audio output device.

FIG. 11 is an example of a schematic diagram of a structure of the audio receiver device 300 according to a technical solution of this application.

As shown in FIG. 11, the audio receiver device 300 may include a processor 302, a memory 303, a Bluetooth communication processing module 304, a power supply 305, a sensor 306, a microphone 307, and an electrical/acoustic converter 308. These components may be connected through a bus.

If the audio receiver device 300 is a neckband Bluetooth headset, the audio receiver device 300 may further include a wire control. The processor 302, the memory 303, the Bluetooth communication processing module 304, and the power supply 305 may be integrated in the wire control. If the audio receiver device 300 is a TWS Bluetooth headset, two headsets may further be integrated with the processor 302, the memory 303, the Bluetooth communication processing module 304, and the power supply 305.

The processor 302 may be configured to read and execute computer-readable instructions. In specific implementation, the processor 302 may mainly include a controller, an arithmetic unit, and a register. The controller is mainly responsible for decoding instructions and sending a control signal for an operation corresponding to the instructions. The arithmetic unit is mainly responsible for performing a fixed-point or floating-point arithmetic operation, a shift operation, a logic operation, and the like, or may perform an address operation and address conversion. The register is mainly responsible for saving a quantity of register operations, intermediate operation results, and the like that are temporarily stored during instruction execution. In specific implementation, a hardware architecture of the processor 302 may be an application-specific integrated circuit (Application-Specific Integrated Circuits, ASIC) architecture, an MIPS architecture, an ARM architecture, an NP architecture, or the like.

In some embodiments, the processor 302 may be configured to parse a signal received by the Bluetooth communication processing module 304, for example, a signal encapsulated with audio data, a content control message, or a flow control message. The processor 302 may be configured to perform a corresponding processing operation based on a parsing result, for example, drive the electrical/acoustic converter 308 to start, pause, or stop converting the audio data into sound.

In some embodiments, the processor 302 may be further configured to generate a signal sent by the Bluetooth communication processing module 304 to the outside, for example, a Bluetooth broadcast signal or a beacon signal, or audio data converted from collected sound.

The memory 303 is coupled to the processor 302, and is configured to store various software programs and/or a plurality of sets of instructions. In specific implementation, the memory 303 may include a high-speed random access memory, and may also include a nonvolatile memory, for example, one or more magnetic disk storage devices, a flash memory device, or another nonvolatile solid-state storage device. The memory 303 may store an operating system, for example, an embedded operating system such as uCOS, VxWorks, or RTLinux. The memory 303 may further store a communication program, and the communication program may be used to communicate with the electronic device 10, one or more servers, or an additional device.

The Bluetooth (BT) communication processing module 304 may receive a signal transmitted by another device (for example, the electronic device 10), for example, a scanning signal, a broadcast signal, a signal encapsulated with audio data, a content control message, or a flow control message. The Bluetooth (BT) communication processing module 304 may also transmit a signal, for example, a broadcast signal, a scanning signal, a signal encapsulated with audio data, a content control message, or a flow control message.

The power supply 305 may be configured to supply power to other internal components such as the processor 302, the memory 303, the Bluetooth communication processing module 304, the sensor 306, and the electrical/acoustic converter 308.

The sensor 306 may include, for example, an infrared sensor, a pressure sensor, a Hall effect sensor, and an optical proximity sensor. The infrared sensor and the pressure sensor may be configured to detect a wearing status of a headset. The Hall effect sensor and the optical proximity sensor may be configured to detect whether a left earbud and a right earbud are attached together.

The microphone 307 may be configured to collect sound, for example, voice of a user, and may output the collected sound to the electrical/acoustic converter 308. In this way, the electrical/acoustic converter 308 may convert the sound collected by the microphone 307 into audio data.

The electrical/acoustic converter 308 may be configured to convert sound into an electrical signal (audio data), for example, convert the sound collected by the microphone 307 into the audio data, and may transmit the audio data to the processor 302. In this way, the processor 302 may trigger the Bluetooth (BT) communication processing module 304 to transmit the audio data. The electrical/acoustic converter 308 may be further configured to convert an electrical signal (audio data) into sound, for example, convert audio data output by the processor 302 into sound. The audio data output by the processor 302 may be received by the Bluetooth (BT) communication processing module 304.

In some implementations, the processor 302 may implement a host in a Bluetooth protocol framework, the Bluetooth (BT) communication processing module 304 may implement a controller in the Bluetooth protocol framework, and the host and the controller communicate with each other through an HCI. That is, functions of the Bluetooth protocol framework are distributed on two chips.

In some other embodiments, the processor 302 may implement the host and the controller in the Bluetooth protocol framework. That is, all functions of the Bluetooth protocol framework are placed on a same chip. That is, the host and controller are placed on the same chip. Because the host and controller are placed on the same chip, the physical HCI is unnecessary, and the host and controller directly interact through an application programming interface API.

It may be understood that the structure shown in FIG. 11 does not constitute a specific limitation on the audio receiver device 300. In some other embodiments of this application, the audio receiver device 300 may include more or fewer components than those shown in the figure, or combine some components, or split some components, or have different component arrangements. The components shown in the figure may be implemented by hardware, software, or a combination of software and hardware.

A person of ordinary skill in the art may understand that all or some of the processes of the methods in embodiments may be implemented by a computer program instructing related hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

What is claimed is:

1. A method comprising:
   establishing, by a first device, a wireless communication connection with a second device;
   sending, by the first device, a first request to the second device through the wireless communication connection;
   sending, by the second device, a first response to the first device, wherein the first response carries first indication information, and wherein the first indication information indicates a presence or an absence of a sound effect processing capability of the second device;
   determining, by the first device and when the first indication information indicates the presence of the sound effect processing capability, whether the first device has a first sound effect processing algorithm that adapts to a second sound effect processing algorithm used by the second device, wherein the second sound effect processing algorithm is based on the first indication information, and wherein when the first device has the first sound effect processing algorithm, the method further comprises:
   establishing, by the first device, an audio connection to the second device;
   processing, by the first device, first audio data using the first sound effect processing algorithm to obtain second audio data;
   transmitting, by the first device, the second audio data to the second device through the audio connection;
   processing, by the second device, the second audio data using the second sound effect processing algorithm to obtain third audio data; and
   playing, by the second device, the third audio data.

2. The method of claim 1, further comprising:
   selecting, by the first device, a set of sound effect processing algorithms from a plurality of sets of sound effect processing algorithms;
   processing, by the first device, test audio data using the set of sound effect processing algorithms and the second sound effect processing algorithm to obtain processed test audio data; and
   further determining, by the first device, that the first device has the first sound effect processing algorithm when at least one of first conditions are met, wherein the set of sound effect processing algorithms comprises the first sound effect processing algorithm, and wherein the first conditions comprise:

measuring, by the first device, a first signal-to-noise ratio after processing the test audio data using the first sound effect processing algorithm, a second signal-to-noise ratio after processing the test audio data using the second sound effect processing algorithm, and a third signal-to-noise ratio based on the processed test audio data and that is better than the first signal-to-noise ratio and the second signal-to-noise ratio; and measuring a first echo component after processing the test audio data using the first sound effect processing algorithm, a second echo component after processing the test audio data using the second sound effect processing algorithm, and a third echo component based on the processed test audio data and that is less than the first echo component and the second echo component.

3. The method of claim 1, wherein the first indication information comprises a device parameter of the second device including at least one of a manufacturer of the second device or a product model of the second device, and wherein the method further comprises:

determining, by the first device, whether a third sound effect processing algorithm corresponding to the device parameter exists in a first mapping table that records correspondences among device parameters of a plurality of devices and a plurality of sets of sound effect processing algorithms, wherein the sets include a set of sound effect processing algorithms that comprises the first sound effect processing algorithm; and determining that the first device has the first sound effect processing algorithm when the third sound effect processing algorithm exists in the first mapping table, wherein the first sound effect processing algorithm is the third sound effect processing algorithm.

4. The method of claim 3, further comprising obtaining, by the first device from a cloud server, the sets of sound effect processing algorithms.

5. The method of claim 1, further comprising determining, by the first device, that the first device does not have the first sound effect processing algorithm and the second device does not have the sound effect processing capability, wherein in response to determining that the first device does not have the first sound effect processing algorithm and the second device does not have the sound effect processing capability, the method further comprises:

establishing, by the first device, the audio connection to the second device;

processing, by the first device, the first audio data using a third sound effect processing algorithm to obtain fourth audio data;

transmitting, by the first device, the fourth audio data to the second device through the audio connection; and playing, by the second device, the fourth audio data.

6. The method of claim 1, further comprising determining, by the first device, that the first device does not have the first sound effect processing algorithm and the second device has the sound effect processing capability, wherein in response to determining that the first device does not have the first sound effect processing algorithm and the second device has the sound effect processing capability, the method further comprises:

establishing, by the first device, the audio connection to the second device;

transmitting, by the first device, the first audio data to the second device through the audio connection;

processing, by the second device, the first audio data using the second sound effect processing algorithm to obtain fourth audio data; and playing, by the second device, the fourth audio data.

7. A method implemented by a first device, wherein the method comprises:

establishing a wireless communication connection with a second device;

sending a first request to the second device through the wireless communication connection;

receiving, from the second device, a first response carrying first indication information, wherein the first indication information indicates a presence or an absence of a sound effect processing capability of the second device;

determining, when the first indication information indicates the presence of the sound effect processing capability, whether a first sound effect processing algorithm exists in a plurality of sets of sound effect processing algorithms of the first device that adapts to a second sound effect processing algorithm on the second device, wherein the second sound effect processing algorithm is based on the first indication information, and wherein when the first device has the first sound effect processing algorithm, the method further comprises:

establishing an audio connection to the second device, wherein the audio connection is to transmit first audio data;

processing the first audio data using the first sound effect processing algorithm to obtain second audio data; and transmitting the second audio data to the second device through the audio connection to enable the second device to play first audio based on the second sound effect processing algorithm.

8. The method of claim 7, further comprising:

selecting a set of sound effect processing algorithms from the sets of sound effect processing algorithms;

processing test audio data using the one set of sound effect processing algorithms and the second sound effect processing algorithm to obtain processed test audio data; and further determining that the first device has the first sound effect processing algorithm when at least one of first conditions are met, wherein the set of sound effect processing algorithms comprises the first sound effect processing algorithm, and wherein the first conditions comprise:

measuring a first signal-to-noise ratio after processing the test audio data using the first sound effect processing algorithm, a second signal-to-noise ratio after processing the test audio data using the second sound effect processing algorithm, and a third signal-to-noise ratio based on the processed test audio data and that is better than the first signal-to-noise ratio and the second signal-to-noise ratio; and measuring a first echo component after processing the test audio data using the first sound effect processing algorithm, a second echo component after processing the test audio data using the second sound effect processing algorithm, and a third echo component based on the processed test audio data and that is less than the first echo component and the second echo component.

9. The method of claim 8, further comprising obtaining, from a cloud server, the sets of sound effect processing algorithms.

10. The method of claim 7, wherein the first indication information comprises a device parameter of the second device including at least one of a manufacturer of the second device or a product model of the second device, and wherein the method further comprises:
- determining whether a third sound effect processing algorithm corresponding to the device parameter exists in a first mapping table that records correspondences among device parameters of a plurality of devices and a plurality of sets of sound effect processing algorithms, wherein the sets include a set of sound effect processing algorithms that comprises the first sound effect processing algorithm, and wherein the corresponding device parameter comprises one or more of a manufacturer of the second device and a product model of the second device; and
- determining that the first device has the first sound effect processing algorithm when the third sound effect processing algorithm exists in the first mapping table, wherein the first sound effect processing algorithm is the third sound effect processing algorithm.

11. The method of claim 7, further comprising determining that the first device does not have the first sound effect processing algorithm and the second device does not have the sound effect processing capability, wherein in response to determining that the first device does not have the first sound effect processing algorithm and the second device does not have the sound effect processing capability, the method further comprises:
- determining that the first device performs sound effect processing on audio data between the first device and the second device using a third sound effect processing algorithm;
- establishing the audio connection to the second device, wherein the audio connection is to transmit the first audio data;
- processing the first audio data using the third sound effect processing algorithm to obtain third audio data; and
- transmitting the third audio data to the second device through the audio connection to enable the second device to play the third audio data.

12. The method of claim 7, further comprising determining that the first device does not have the first sound effect processing algorithm and the second device has the sound effect processing capability, wherein in response to determining that the first device does not have the first sound effect processing algorithm and the second device has the sound effect processing capability, the method further comprises:
- establishing the audio connection to the second device, wherein the audio connection is to transmit the first audio data; and
- transmitting the first audio data to the second device through the audio connection to enable the second device to play second audio based on the second sound effect processing algorithm.

13. The method of claim 7, wherein the wireless communication connection comprises a Logical Link Control and Adaptation Protocol (L2CAP) connection.

14. The method of claim 13, wherein the first request comprises an L2CAP echo request, and wherein the first response comprises an L2CAP echo response.

15. The method of claim 13, wherein the audio connection comprises a media audio connection established based on the L2CAP connection, and wherein the second audio data comprises media audio data.

16. The method of claim 15, wherein the media audio connection comprises an Advanced Audio Distribution Profile (A2DP) connection.

17. The method of claim 13, further comprising:
- detecting a user operation of playing media audio; and
- further establishing, in response to detecting the user operation of playing the media audio, the audio connection to the second device.

18. The method of claim 7, wherein the wireless communication connection comprises a radio frequency communication (RFCOMM) connection.

19. A first device comprising:
- a memory configured to store instructions; and
- a processor coupled to the memory and configured to execute the instructions to cause the first device to:
  - establish a wireless communication connection with a second device;
  - send a first request to the second device through the wireless communication connection;
  - receive, from the second device, a first response carrying first indication information, wherein the first indication information indicates a sound effect processing capability of the second device;
  - determine whether a first sound effect processing algorithm exists in a plurality of sets of sound effect processing algorithms of the first device, wherein the first sound effect processing algorithm adapts to a second sound effect processing algorithm on the second device; and
  - determine the second sound effect processing algorithm based on the first indication information,
- wherein when the first device comprises the first sound effect processing algorithm, the processor further executes the instructions to cause the first device to:
  - establish an audio connection to the second device, wherein the audio connection transmits first audio data;
  - process the first audio data using the first sound effect processing algorithm to obtain second audio data; and
  - transmit the second audio data to the second device through the audio connection to enable the second device to play audio based on the second sound effect processing algorithm.

20. A computer program product comprising computer-executable instructions that are stored on a non-transitory computer-readable storage medium and that, when executed by a processor, cause a first device to:
- establish a wireless communication connection with a second device;
- send a first request to the second device through the wireless communication connection;
- receive, from the second device, a first response carrying first indication information, wherein the first indication information indicates a sound effect processing capability of the second device;
- determine whether a first sound effect processing algorithm exists in a plurality of sets of sound effect processing algorithms of the first device, wherein the first sound effect processing algorithm adapts to a second sound effect processing algorithm on the second device; and determine the second sound effect processing algorithm based on the first indication information, wherein when the first device comprises the first sound effect processing algorithm, the processor further executes the instructions to cause the first device to:

establish an audio connection to the second device, wherein the audio connection transmits first audio data;

process the first audio data using the first sound effect processing algorithm to obtain second audio data; and transmit the second audio data to the second device through the audio connection to enable the second device to play audio based on the second sound effect processing algorithm.

* * * * *